United States Patent [19]
Kocher et al.

[11] Patent Number: 6,033,758
[45] Date of Patent: Mar. 7, 2000

[54] LAMINATE HAVING A COEXTRUDED, MULTILAYER FILM WHICH DELAMINATES AND PACKAGE MADE THEREFROM

[75] Inventors: Patrick N. Kocher; Kimberly Ann Mudar, both of Greer; Walter Berndt Mueller, Inman; H. Walker Stockley, Spartanburg, all of S.C.

[73] Assignee: Cryovac, Inc., Duncan, S.C.

[21] Appl. No.: 09/237,756

[22] Filed: Jan. 26, 1999

Related U.S. Application Data

[60] Division of application No. 08/764,405, Dec. 22, 1996, Pat. No. 5,919,547, which is a continuation-in-part of application No. 08/471,065, Jun. 6, 1995, Pat. No. 5,686,126.

[51] Int. Cl.$^7$ ............... B32B 3/10; B32B 3/04; A21D 10/02; B65B 55/00
[52] U.S. Cl. ............ 428/138; 426/127; 426/129; 426/396; 428/121
[58] Field of Search .............. 426/127, 129, 426/396; 428/121, 138

[56] References Cited

U.S. PATENT DOCUMENTS

| | | | |
|---|---|---|---|
| 1,042,119 | 10/1912 | Kavanagh | 426/8 |
| 2,260,064 | 10/1941 | Stokes | 93/3 |
| 2,623,826 | 12/1952 | Grinstead | 99/174 |
| 2,814,381 | 11/1957 | Stevick | 206/45.34 |
| 2,925,346 | 2/1960 | Harper | 99/174 |
| 3,019,573 | 2/1962 | Navikas | 53/27 |
| 3,074,798 | 1/1963 | Palmer | 99/174 |
| 3,360,382 | 12/1967 | Miller | 99/174 |
| 3,561,668 | 2/1971 | Bergstrom | 220/215 |
| 3,574,642 | 4/1971 | Weinke | 99/174 |
| 3,681,092 | 8/1972 | Titchenal et al. | 99/174 |
| 3,713,849 | 1/1973 | Grindrod et al. | 99/174 |
| 3,716,180 | 2/1973 | Bemiss et al. | 229/220 |
| 3,783,089 | 1/1974 | Hurst et al. | 161/166 |
| 3,808,394 | 4/1974 | Mominee et al. | 219/121 |
| 3,843,806 | 10/1974 | Kishpaugh et al. | 426/106 |
| 4,055,672 | 10/1977 | Hirsch et al. | 426/127 |
| 4,264,392 | 4/1981 | Watt | 156/272 |
| 4,438,850 | 3/1984 | Kahn | 206/634 |
| 4,490,145 | 12/1984 | Campbell | 604/333 |

(List continued on next page.)

FOREIGN PATENT DOCUMENTS

| | | |
|---|---|---|
| 0 261 930 | 9/1987 | European Pat. Off. . |
| 0 270 764 | 10/1987 | European Pat. Off. . |
| 0 698 563 A1 | 8/1995 | European Pat. Off. . |
| 0 721 899 A1 | 1/1996 | European Pat. Off. . |
| 0 769 454 A1 | 9/1996 | European Pat. Off. . |
| 2 323 594 | 9/1975 | France . |
| 2 240 234 | 8/1971 | Germany . |
| 38 31 234 A1 | 9/1988 | Germany . |
| 920233770 | 9/1992 | Japan . |
| 2 251 540 | 1/1991 | United Kingdom . |
| 87/02965 | 5/1987 | WIPO . |
| 90/01005 | 2/1990 | WIPO . |
| 96/15903 | 5/1996 | WIPO . |
| 96/39341 | 12/1996 | WIPO . |

*Primary Examiner*—Hankyel Park
*Attorney, Agent, or Firm*—Thomas C. Lagaly

[57] ABSTRACT

A laminate comprising two or more films, at least one of the films being a coextruded, multilayer film, wherein the laminate delaminates within the coextruded, multilayer film when the laminate is subjected to a peel force ranging from 0.001 to 2.5 pounds per inch. The laminate advantageously provides the lid for a package and delaminates into a substantially gas-impermeable portion and a gas-permeable portion, with the gas-permeable portion being bonded directly to a product support member of the package. In this manner, the gas-impermeable portion may be peelably removed from the package to allow atmospheric oxygen to enter the interior of the package. The gas-permeable portion may be provided by perforating the delaminatable, coextruded film and bonding such film to the support member so that, when the laminate is caused to be delaminated within the perforated, coextruded film, the perforations are exposed to the ambient atmosphere and thereby allow for rapid ingress of oxygen into the interior of the package.

27 Claims, 7 Drawing Sheets

U.S. PATENT DOCUMENTS

| | | | |
|---|---|---|---|
| 4,522,835 | 6/1985 | Woodruff et al. | 426/264 |
| 4,590,078 | 5/1986 | Umina | 426/113 |
| 4,634,614 | 1/1987 | Holzner | 428/35 |
| 4,667,814 | 5/1987 | Wakamatsu et al. | 206/0.7 |
| 4,700,531 | 10/1987 | Hsu et al. | 53/412 |
| 4,816,027 | 3/1989 | Gilchrist et al. | 604/339 |
| 4,840,271 | 6/1989 | Garwood | 206/213.1 |
| 4,842,875 | 6/1989 | Anderson | 426/118 |
| 4,847,148 | 7/1989 | Schirmer | 428/332 |
| 4,886,372 | 12/1989 | Greengrass et al. | 383/100 |
| 4,886,690 | 12/1989 | Davis et al. | 428/36.6 |
| 4,889,731 | 12/1989 | Williams, Jr. | 426/106 |
| 4,901,505 | 2/1990 | Williams, Jr. | 53/412 |
| 4,910,033 | 3/1990 | Bekele et al. | 426/129 |
| 5,045,331 | 9/1991 | Antoon, Jr. | 426/118 |
| 5,079,059 | 1/1992 | Wyslotsky | 428/43 |
| 5,132,151 | 7/1992 | Grancy | 428/40 |
| 5,226,531 | 7/1993 | Garwood | 206/213.1 |
| 5,296,291 | 3/1994 | Mueller | 428/349 |
| 5,316,607 | 5/1994 | Johnsen et al. | 156/212 |
| 5,341,930 | 8/1994 | Counts et al. | 206/459.5 |
| 5,346,735 | 9/1994 | Logan et al. | 428/36.7 |
| 5,348,752 | 9/1994 | Gorlich | 426/129 |
| 5,402,622 | 4/1995 | Stockley, III et al. | 53/427 |
| 5,419,096 | 5/1995 | Gorlich | 53/432 |
| 5,419,097 | 5/1995 | Gorlich et al. | 53/432 |
| 5,423,782 | 6/1995 | Wolrich | 604/339 |
| 5,439,132 | 8/1995 | Gorlich | 220/359 |
| 5,492,705 | 2/1996 | Porchia et al. | 426/106 |
| 5,518,790 | 5/1996 | Huber et al. | 428/35.2 |
| 5,545,154 | 8/1996 | Oberholtzer | 604/336 |
| 5,560,182 | 10/1996 | Garwood | 53/432 |
| 5,591,144 | 1/1997 | Smith et al. | 604/327 |
| 5,672,163 | 9/1997 | Ferreira et al. | 604/333 |
| 5,686,126 | 11/1997 | Noel et al. | 426/127 |
| 5,686,127 | 11/1997 | Stockley, III et al. | 426/129 |
| 5,722,965 | 3/1998 | Kukczynski | 604/344 |
| 5,759,650 | 6/1998 | Raines et al. | 428/35.7 |
| 5,785,695 | 7/1998 | Sato et al. | 604/339 |

LAMINATE HAVING A COEXTRUDED, MULTILAYER FILM WHICH DELAMINATES AND PACKAGE MADE THEREFROM

This application is a division of U.S. Ser. No. 08/764, 405, filed on Dec. 22, 1996, now U.S. Pat. No. 5,919,547, which is a Continuation-in-Part of U.S. Ser. No. 08/471,065, filed Jun. 6, 1995 now U.S. Pat. No. 5,686,126, the disclosure of which is hereby incorporated by reference herein.

BACKGROUND OF THE INVENTION

The present invention relates to packaging for products, such as food products, which are enclosed under certain environmental conditions in a support member having a lid which peelably delaminates (i.e., delaminates upon peeling) to expose a gas-permeable film, thereby causing a change in the environmental conditions within the package. More specifically, the invention relates to such packaging for fresh red meat products.

Historically, large sub-primal cuts of meat have been butchered and packaged in each supermarket. This arrangement has long been recognized to be inefficient and expensive. It would instead be preferable to butcher and package the meat at a central processing facility which benefits from economies of scale, and then ship the packaged meat to benefits from economies of scale, and then ship the packaged meat to individual supermarkets or other retail outlets such as is done, for example, with many poultry products. It is believed that central processing of meat would also lead to a higher quality, more sanitary product with a longer shelf-life than meat which is butchered and packaged in individual supermarkets.

Fresh red meat presents a particular challenge to the concept of centralized processing and packaging due to its oxygen-sensitivity. Such oxygen-sensitivity is manifested in the shelf-life and appearance (color) of a packaged meat product. For example, while a low-oxygen packaging environment generally increases the shelf-life of a packaged meat product (relative to meat products packaged in an environment having a higher oxygen content), red meat has a tendency to assume a purple color when packaged in the absence of oxygen or in an environment having a very low oxygen concentration, i.e., below about 5% oxygen. Unfortunately, such a purple color is undesirable to most consumers, and marketing efforts to teach the consumer about the acceptability of the purple color have been largely ineffective. When meat is exposed to a sufficiently high concentration of oxygen, e.g., as found in air, it assumes a bright red color which most consumers associate with freshness. After 1 to 3 days of such exposure, however, meat assumes a brown color which, like the purple color, is undesirable to most consumers (and indicates that the meat is beginning to spoil).

Thus, in order to effectively butcher and package meat products in a central facility for distribution to retail outlets, the meat would desirably be packaged, shipped, and stored in a low-oxygen environment for extended shelf-life, and then displayed for consumer sale in a relatively high-oxygen environment such that the meat is caused to "bloom" into a red color just before being placed in a retail display case. While in the retail display case, the meat product is desirably contained in a package which protects it from microbial and other contamination. In order to attain the maximum economic benefit from centralized packaging, the package in which the meat product is displayed for consumer sale is the same package in which the meat product is initially packaged and shipped from the central processing facility. As can be appreciated, centralized butchering and packaging of fresh red meat presents a number of difficult packaging challenges.

A variety of packages have been developed in an effort to overcome the foregoing challenges. One attempted solution is to use a dual-film cover or lid over a support member, such as an oxygen-barrier tray, which contains the meat product. The support member generally includes a cavity, in which the product is contained, surrounded by a peripheral flange to which the lid is secured. One film of the dual-film lid is relatively oxygen-impermeable, i.e., provides a substantial barrier to the passage of oxygen therethrough, and is removably positioned above a second film that is relatively oxygen-permeable, i.e., sufficiently permeable to the passage of oxygen to allow the packaged meat product to bloom. Thus, the package may be shipped with the upper, impermeable film intact so that a low-oxygen environment may be maintained within the package during shipping. Then the impermeable film may be removed at the supermarket just prior to placing the package in a retail display case. Since the lower film is oxygen permeable, it allows the meat product to bloom in the presence of oxygen which enters the package from the ambient atmosphere.

Conventional dual-film packaging arrangements can employ either separate, discrete permeable and impermeable lids which are attached separately to the support member, or a single, peelable lid which may delaminate into permeable and impermeable films. With the separate film approach, the permeable and impermeable lids are typically sealed to separate locations on the support member flange, with the permeable lid being sealed to an inner periphery of the flange and the impermeable lid being sealed to an outer periphery of the flange, i.e., outboard of the flange area at which the permeable lid is sealed. One drawback of this approach is the difficulty of sealing two separate lids to a conventional, single-flange tray in an automated fashion, i.e., continuously from separate permeable and impermeable webs of film. The permeable lid must be applied to the tray flange from a continuous web, secured (e.g., heat-welded) to an inner periphery of the flange, and then severed from the web in such a manner as to leave a sufficient area on an outer periphery of the flange to which the impermeable lid can be secured and severed from a continuous web of an impermeable film. Since this approach involves two separate lidding operations, it entails a relatively complex and expensive packaging procedure (as compared to a single-lid packaging operation). For example, it is difficult to sever the permeable lid from the web in such a manner that sufficient room is left on the outer periphery of the flange to provide a sealing surface for the impermeable lid without damaging the outer flange periphery. It is also difficult to completely remove atmospheric oxygen from the space between the permeable and impermeable lids.

While single, peelable lids have the advantage of providing a single web for sealing to a conventional tray flange, such films often fail during peeling, with the impermeable film either being difficult to delaminate from the permeable film or with all or part of the permeable film remaining bonded to the impermeable film and tearing away from the rest of the package, thereby resulting in tears or holes in the package which expose the packaged meat product to dirt or contamination. The primary difficulty in achieving consistent and reliable peelability in a single, peelable lid lies in the manner in which the permeable and impermeable films are adhered to one another. That is, with conventional peelable lids, the same mechanism which bonds the permeable and impermeable films is also relied upon to allow the two films to be peelably separated. Such mechanisms include, e.g., the use of heat and pressure (e.g., heated rollers) to bond the two films, or an adhesive layer sandwiched between and bonding the two films. The bond which is formed must be strong enough to prevent film separation during shipping and storage so that oxygen does not prematurely enter the package via the gas-permeable film (i.e., prior to the time when the retail worker intentionally peels the impermeable film from the permeable film). At the same time, the bond between the two films must provide sufficient peelability that the two films can be separated without tearing or otherwise compromising the permeable film as noted above. As can be readily appreciated, these are difficult and somewhat conflicting requirements to meet. Not only can the strength of the bond between the permeable and impermeable films vary due to manufacturing fluctuations, but the bond-strength can also change over time due to, e.g., migration of components (e.g., antifog agents) within one or both films to the interface between the films, temperature variations, etc., all of which can cause physical and/or chemical changes to the bond. In addition, it is often desirable that the the permeable film contain very small perforations (e.g., less than about 250 microns in diameter) in order to increase the rate at which the packaged meat product blooms after removal of the impermeable film. Conventional mechanisms for bonding the permeable and impermeable films often interfere with the ability of such perforations to allow atmospheric oxygen to pass therethrough after the impermeable film has been removed. For example, the use of heat and pressure to bond the two films can weld closed the perforations while an adhesive can occlude the perforations (i.e., partially fills the perforations and thereby blocks the passage of oxygen therethrough).

Accordingly, there is a need in the art for a duai-film package which combines the manufacturing simplicity of a package having a single, peelable lid with the consistent peelability of a package having separate permeable and impermeable lids.

SUMMARY OF THE INVENTION

That need is met by the present invention which provides a laminate comprising two or more films, at least one of the films being a coextruded, multilayer film, wherein the laminate delaminates within the coextruded, multilayer film when the laminate is subjected to a peel force ranging from 0.001 to 2.5 pounds per inch.

In accordance with another aspect of the invention, a package is provided, comprising:
a. a product support member having a cavity formed therein, a product being disposed within the cavity;
b. a lid enclosing the product within the cavity and being bonded to the support member, the lid comprising a laminate which comprises two or more films, at least one of the films being a coextruded, multilayer film, wherein the laminate delaminates within the coextruded, multilayer film when the laminate is subjected to a peel force ranging from 0.001 to 2.5 pounds per inch.

In accordance with yet another aspect of the invention, a method of making a package is provided, comprising the steps of:
a. providing a product support member having a cavity formed therein;
b. placing a product in the cavity;
c. providing a laminate comprising two or more films, at least one of the films being a coextruded, multilayer film, wherein the laminate delaminates within the coextruded, multilayer film when the laminate is subjected to a peel force ranging from 0.001 to 2.5 pounds per inch; and
d. placing the laminate over the support member and applying sufficient heat and pressure to the laminate to enclose the product within the cavity of the support member by forming a heat-weld which bonds the laminate to the support member.

In a preferred embodiment of the invention, the laminate provides the lid for a package and delaminates into a substantially gas-impermeable portion and a gas-permeable portion, with the gas-permeable portion being bonded directly to the support member of the package. In this manner, the gas-impermeable portion may be peelably removed from the package to allow atmospheric oxygen to enter the interior of the package. In a particularly preferred embodiment, the gas-permeable portion is provided by perforating the delaminatable, coextruded film and bonding such film to the support member so that, when the laminate is caused to be delaminated within the perforated, coextruded film, the perforations are exposed to the ambient atmosphere and thereby allow for rapid ingress of oxygen into the interior of the package.

By thus providing a package having a lid formed from a laminate which delaminates within a multilayer, coextruded film in the laminate, the invention minimizes many of the above-described disadvantages of a package having separate permeable and impermeable lids, and also the disadvantages of a single, peelable lid which delaminates at the interface of component permeable and impermeable films.

Definitions

As used herein, the term "laminate" refers to a multiple-film composite structure having two or more films bonded together by any suitable means, including adhesive bonding; reactive surface modification (e.g., corona treatment, flame treatment, or plasma treatment); heat treatment; pressure treatment; etc., including combinations thereof.

As used herein, the term "film" refers to a thermoplastic material, generally in sheet or web form, having one or more layers formed from polymeric or other materials. A film can be a monolayer film (having only one layer) or a multilayer film (having two or more layers).

As used herein, the term "multilayer" refers to film comprising two or more layers which are bonded together by one or more of the following methods: coextrusion, extrusion coating, vapor deposition coating, solvent coating, emulsion coating, or suspension coating.

As used herein, the terms "extrusion," "extrude," and the like refer to the process of forming continuous shapes by forcing a molten plastic material through a die, followed by cooling or chemical hardening. Immediately prior to extrusion through the die, the relatively high-viscosity polymeric material is fed into a rotating screw, which forces it through the die.

As used herein, the term "coextrusion," "coextrude," and the like refer to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

As used herein, the term "layer" refers to a discrete film component which is coextensive with the film and has a substantially uniform composition. In a monolayer film, the "film" and "layer" would be one and the same.

As used herein, the phrases "reactive surface modification," "reactively modifying the surface of," "reactively-modified surface" and the like refer to chemically altering the surface of a film in order to incorporate reactive species onto such film surface, e.g., to provide the film surface with auto-adhesion functionality (i.e., rendering the surface capable of adhering to another surface without the need for an adhesive). Specific examples of reactive surface modification include corona treatment, plasma (ionized gas) treatment, and flame treatment, with corona treatment being preferred. The surface of a film which has been subjected to reactive surface modification is referred to as a "modified surface" or, in the case of corona treatment, a "corona treated surface."

As used herein, the terms "delaminate," "delaminates," and the like refer generally to the internal separation of a film or laminate and, more specifically, to the separation of a coextruded, multilayer film within a layer and/or at an inter-layer (i.e., layer/layer) interface within the coextruded film when such film, or laminate of which the coextruded film is a component, is subjected to a peel force of sufficient magnitude. A laminate in accordance with the present invention includes at least one coextruded, multilayer film having an intra-film cohesive strength which is both lower than the inter-film bond-strengths between the component films of the laminate and also lower than the intra-film cohesive strengths of the other films in the laminate. In this manner, the coextruded, multilayer film component of the laminate internally separates, i.e., delaminates, when the laminate is subjected to a peel force which exceeds the intra-film cohesive strength of the coextruded film.

As used herein, the term "intra-film cohesive strength" refers to the internal force with which a film remains intact, as measured in a direction that is perpendicular to the plane of the film. In a multilayer film, intra-film cohesive strength is provided both by inter-layer adhesion (the adhesive strength between the layers which binds them to one another) and by the intra-layer cohesion of each film layer (i.e., the cohesive strength of each of the film layers). In a monolayer film, intra-film cohesive strength is provided only by the intra-layer cohesion of the layer which constitutes the film.

As used herein, the terms "peel," "peeling," and the like refer generally to the act of removing one or more layers from a multilayer film by manually grasping and pulling back the layers along a plane or interface of relatively low bond-strength or within a layer having relatively weak intra-layer cohesion. More specifically, peeling includes the removal of one or more layers from a coextruded, multilayer film in a laminate, along with one or more films which are attached to the layers removed from the coextruded, multilayer film.

As used herein, the term "peel force" refers to the amount of force required to ply-separate two layers, and/or internally separate one layer, of a multilayer film or laminate, as measured in accordance with ASTM F904-91.

As used herein, the term "bond-strength" refers generally to the adhesive force with which two adjacent films, or two adjacent film layers, are connected and, more specifically, to the force with which two films are connected by a heat-weld. Bond-strength can be measured by the force required to separate two films or film layers that are connected, e.g., via a heat-weld, in accordance with ASTM F88-94.

As used herein, the phrase "gas-permeable" refers to a film or film portion which admits at least about 1,000 cc of gas, such as oxygen, per square meter of film per 24 hour period at 1 atmosphere and at a temperature of 73° F. (at 0% relative humidity). More preferably, a gas-permeable film or film portion admits at least 5,000, even more preferably at least 10,000, such as at least 15,000, 20,000, 25,000, 30,000, 35,000, 40,000, and 50,000, and most preferably at least 100,000 cc of oxygen per square meter per 24 hour period at 1 atmosphere and at a temperature of 73° F. (at 0% relative humidity). In accordance with the present invention, a gas-permeable film or film portion can itself have the aforedescribed levels of gas permeability or, alternatively, can be a film or film portion which does not inherently possess the aforedescribed levels of gas permeability but which is altered, e.g., perforated or peelably delaminated, to render the film gas-permeable as defined above.

As used herein, the phrase "substantially gas-impermeable" refers to a film or film portion which admits less than 1000 cc of gas, such as oxygen, per square meter of film per 24 hour period at 1 atmosphere and at a temperature of 73° F. (at 0% relative humidity). More preferably, a substantially gas-impermeable film admits less than about 500, such as less than 300, and less than 100 cc of gas, more preferably still less than about 50 cc, and most preferably less than 25 cc, such as less than 20, less than 15, less than 10, less than 5, and less than 1 cc of gas per square meter per 24 hour period at 1 atmosphere and at a temperature of 73° F. (at 0% relative humidity).

As used herein, the phrase "product support member" refers to a component of a package on or in which a product is disposed. Meat products are typically disposed in a tray-like package component comprising, e.g., expanded polystyrene sheet material which has been thermoformed into a desired shape, for supporting the meat product. A product support member preferably includes a cavity into which the product is disposed and a peripheral flange which provides a sealing surface for attachment of a lid to the support member to thereby enclose the product within the cavity.

As used herein, the phrase "sealant film" refers to a film which is conformably bonded to at least one of the exterior surfaces of a product support member. Preferably, the sealant film is bonded to the upper, as opposed to the lower, exterior surface of the support member and is a substantially gas-impermeable film.

As used herein, the phrase "ethylene/alpha-olefin copolymer" generally designates copolymers of ethylene with one or more comonomers selected from $C_3$ to $C_{20}$ alpha-olefins, such as 1-butene, 1-pentene, 1-hexene, 1-octene, methyl pentene and the like, in which the polymer molecules comprise long chains with relatively few side chain branches. These polymers are obtained by low pressure polymerization processes and the side branching which is present will be short compared to non-linear polyethylenes (e.g., LDPE, a low density polyethylene homopolymer). Ethylene/alpha-olefin copolymers generally have a density in the range of from about 0.86 g/cc to about 0.94 g/cc. The term linear low density polyethylene (LLDPE) is generally understood to include that group of ethylene/alpha-olefin copolymers which fall into the density range of about 0.915 to about 0.94 g/cc. Sometimes linear polyethylene in the density range from about 0.926 to about 0.94 is referred to as linear medium density polyethylene (LMDPE). Lower density ethylene/alpha-olefin copolymers may be referred to as very low density polyethylene (VLDPE, typically used to refer to the ethylene/ butene copolymers available from Union Carbide with a density ranging from about 0.88 to about 0.91 g/cc) and ultra-low density polyethylene (ULDPE, typically used to refer to the ethylene/octene copolymers supplied by Dow).

The phrase "ethylene/alpha-olefin copolymer" also includes homogeneous polymers such as metallocene-catalyzed EXACT™ linear homogeneous ethylene/alpha-olefin copolymer resins obtainable from the Exxon Chemical Company, of Baytown, Tex.; TAFMER™ linear homogeneous ethylene/alpha-olefin copolymer resins obtainable from the Mitsui Petrochemical Corporation; and long-chain branched, metallocene-catalyzed homogeneous ethylene/alpha-olefin copolymers available from The Dow Chemical Company, known as AFFINITY™ resins. The phrase "homogeneous polymer" refers to polymerization reaction products of relatively narrow molecular weight distribution and relatively narrow composition distribution. Homogeneous polymers are structurally different from heterogeneous polymers (e.g., ULDPE, VLDPE, LLDPE, and LMDPE) in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysts, rather than using Ziegler-Natta catalysts. Such single-site catalysts typically have only one type of catalytic site, which is believed to be the basis for the homgeniety of the polymers resulting from the polymerization.

As used herein, the term "olefin" generally refers to any one of a class of monounsaturated, aliphatic hydrocarbons of the general formula $C_nH_{2n}$, such as ethylene, propylene, and butene. The term may also include aliphatics containing more than one double bond in the molecule such as a diolefin or diene, e.g., butadiene.

As used herein, the term "polyolefin" refers to olefin polymers and copolymers, especially ethylene and propylene polymers and copolymers, and to polymeric materials having at least one olefinic comonomer, such as ethylene vinyl acetate copolymer and ionomer. Polyolefins can be linear, branched, cyclic, aliphatic, aromatic, substituted, or unsubstituted. Included in the term polyolefin are homopolymers of olefin, copolymers of olefin, copolymers of an olefin and a non-olefinic comonomer copolymerizable with the olefin, such as vinyl monomers, modified polymers of the foregoing, and the like. Modified polyolefins include modified polymers prepared by copolymerizing the homopolymer of the olefin or copolymer thereof with an unsaturated carboxylic acid, e.g., maleic acid, fumaric acid or the like, or a derivative thereof such as the anhydride, ester metal salt or the like. It could also be obtained by incorporating into the olefin homopolymer or copolymer, an unsaturated carboxylic acid, e.g., maleic acid, fumaric acid or the like, or a derivative thereof such as the anhydride, ester metal salt or the like.

As used herein, the term "oriented" or "stretch-oriented" refers to a polymer-containing material which has been stretched at an elevated temperature (the orientation temperature), followed by being "set" in the stretched configuration by cooling the material while substantially retaining the stretched dimensions. A material can be stretched in one direction (uniaxial orientation), two directions (biaxial orientation), or multiple directions. Biaxial orientation typically occurs in two directions which are perpendicular to one another, such as the longitudinal direction and the transverse direction.

As used herein, the term "heat-weld" (also known as a "heat-seal") refers to the union of two films by bringing the films into contact, or at least close proximity, with one another and then applying sufficient heat and pressure to a predetermined area (or areas) of the films to cause the contacting surfaces of the films in the predetermined area to become molten and intermix with one another, thereby forming an essentially inseparable bond between the two films in the predetermined area when the heat and pressure are removed therefrom and the area is allowed to cool. Two or more heat-welds uniting three or more films may be formed simultaneously by bringing three or more films into contact and applying heat and pressure in a predetermined area as just described, thereby causing the contacting surfaces of the three or more films in the predetermined area to form two or more essentially inseparable bonds between the three or more films in the predetermined area. A heat-weld may also be formed between two layers within a film or across an adhesive layer already bonding two films together (either as a single heat-weld or as a pair of heat-welds between the adhesive layer and each of the films bonded thereto). In accordance with the practice of the present invention, a heat-weld preferably creates a hermetic seal, i.e., a barrier to the outside atmosphere.

DETAILED DESCRIPTION OF THE INVENTION

Figure 1:
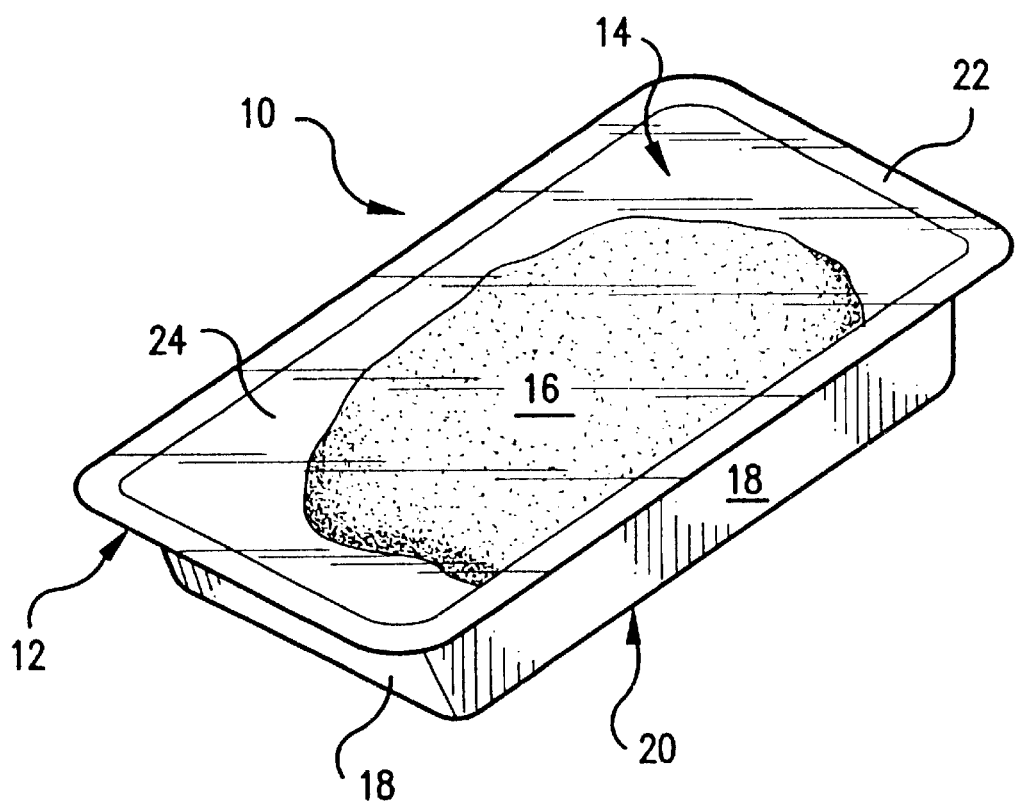
FIG. 1 is a perspective view a package in accordance with the present invention, including a product support member with a product disposed therein and a lid heat-sealed to the support member to enclose the product therein, the lid comprising a coextruded, multilayer film heat-welded to the support member and a gas-impermeable film bonded to and positioned above the gas-permeable film.

FIG. 1 illustrates package 10 which, in accordance with present invention, includes product support member 12 having a cavity 14 formed therein and a product 16 disposed within the cavity. Support member 12 is preferably in the form of a tray having side walls 18 and a base 20 which define the cavity 14, and further includes a peripheral flange 22 extending outwardly from the cavity. A lid 24 encloses the product 16 within cavity 14 by being heat-welded to flange 22.

Figure 2:
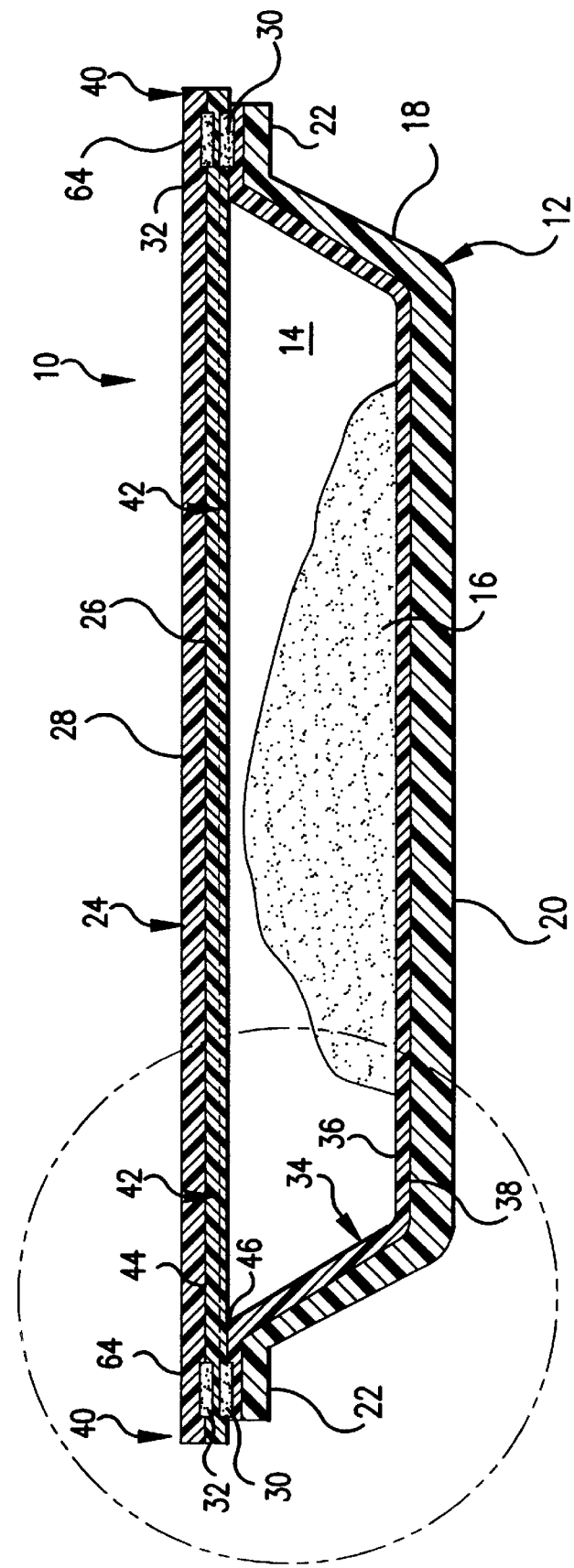
FIG. 2 is a schematic, cross-sectional view the package shown in FIG. 1.

FIG. 2 shows package 10 in greater detail. Lid 24 is a laminate comprising two or more films, at least one of the films being a coextruded, multilayer film 26. When the laminate is subjected to a peel force ranging from 0.001 to 2.5 pounds per inch, lid 24 delaminates within coextruded, multilayer film 26. Other films may be included in the laminate as necessary or desired, preferably including a substantially gas-impermeable film 28 comprising an oxygen-barrier material such as, e.g., vinylidene chloride copolymer, polyamide, polyethylene terephthalate, ethylene/vinyl alcohol copolymer, etc.

Lid 24 and support member 12 preferably form a substantially gas-impermeable enclosure for product 16 which substantially completely protects the product from contact with the surrounding environment including, in particular, atmospheric oxygen, but also including dirt, dust, moisture, microbial contaminates, etc., especially when product 16 is a food product. When product 16 is oxygen-sensitive, i.e., perishable, degradable, or otherwise changeable in the presence of oxygen, such as fresh red meat products (e.g., beef, veal, lamb, pork, etc.), poultry, fish, cheese, fruits, or vegetables, it is preferred that product 16 be packaged in a low-oxygen environment within package 10 to maximize the shelf-life of the product.

A first heat-weld 30 bonds coextruded, multilayer film 26 to flange 22 of support member 12. Although flange 22 is illustrated as a simple, single-surface flange, various flange configurations are possible, and the gas-impermeable film 26 of lid 24 may be bonded to any desired upper surface thereof (i.e., generally upward facing surface of the flange as determined when the support member is in an upright position as shown). Preferably, first heat-weld 30 extends continuously around the upper surface of flange 22 to thereby hermetically seal product 16 within package 10.

Support member 12 preferably includes a sealant film 34 having an upper principal surface 36 and a lower principal surface 38. The lower surface 38 is bonded to cavity 14 and to the upper surface of flange 22. In this manner, the upper surface 38 of sealant film 34 defines the uppermost surface of support member 12 which is thereby in direct contact with product 16 in cavity 14 and in contact with coextruded, multilayer film 26 of lid 24 on the upper surface of flange 22. More specifically, coextruded, multilayer film 26 is actually bonded, via first heat-weld 30, to the upper surface 36 of sealant film 34 at flange 22. Thus, it is preferred that sealant film 34 fully lines, i.e., is conformably bonded to, the entire upper surface of support member 12. If desired, a second sealant film may be bonded to the lower surface of support member 12. It is to be understood that, although it is not required for support member 12 to include a sealant film, it is preferable to include such a sealant film as a liner for at least the upper surface of support member 12 as a means to improve the functional characteristics of the support member when such improvement is deemed necessary or desirable. For example, if the support member is constructed of a material which is not sufficiently gas-impermeable for the intended package application, a sealant film which provides the required degree of gas-impermeability may be employed. A sealant film may also be used to improve the bond-strength of the first heat-weld 30, i.e., when the coextruded, multilayer film and support member are constructed of materials which are not readily capable of forming a sufficiently strong heat-weld, a sealant film may be used which both bonds well to the upper surface of the support member and also forms a strong heat-weld with the coextruded, multilayer film.

Support member 12 can have any desired configuration or shape, e.g., rectangular, round, oval, etc. Similarly, flange 22 may have any desired shape or design, including a simple, substantially flat design which presents a single sealing surface as shown, or a more elaborate design which presents two or more sealing surfaces, such as the flange configurations disclosed in U.S. Pat. Nos. 5,348,752 and 5,439,132, the disclosures of which are hereby incorporated herein by reference. The flange may also include a peripheral lip positioned adjacent and exterior to the sealing surface to facilitate the peelable delamination of lid 24, such as disclosed in U.S. Ser. No. 08/733,843, entitled PACKAGE HAVING PEEL INITIATION MECHANISM and filed Oct. 18, 1996, the disclosure of which is hereby incorporated herein by reference.

Suitable materials from which support member 12 can be formed include, without limitation, polyvinyl chloride, polyethylene terephthalate, polystyrene, polyolefins such as high density polyethylene or polypropylene, paper pulp, nylon, polyurethane, etc. The support member may be foamed or non-foamed as desired, and preferably provides a barrier to the passage of oxygen therethrough, particularly when product 16 is a food product which is oxygen-sensitive. When such oxygen-sensitive products are to be packaged in a low-oxygen environment (to thereby extend their shelf-life), support member 12 preferably allows less than or equal to about 1000 cc of oxygen to pass, more preferably less than about 500 cc of oxygen, more preferably still less than about 100 cc, even more preferably less than about 50 cc, and most preferably less than about 25 cc of oxygen to pass per square meter of material per 24 hour period at 1 atmosphere and at a temperature of 73° F. (at 0% relative humidity). Support member 12 may be formed from a material which itself provides a barrier to the passage of oxygen, e.g., vinylidene chloride copolymer, nylon, polyethylene terephthalate, ethylene/vinyl alcohol copolymer, etc. Alternatively, support member 12 may have a substantially gas-impermeable sealant film 34 laminated or otherwise bonded to the inner or outer surface thereof as described above, and as also disclosed in U.S. Pat. Nos. 4,847,148 and 4,935,089, and in U.S. Ser. No. 08/326,176, filed Oct. 19, 1994 and entitled "Film/Substrate Composite Material" (published as EP 0 707 955 A1 on Apr. 24, 1996), the disclosures of which are hereby incorporated herein by reference. Sealant film 34 preferably includes an oxygen-barrier material such as e.g., vinylidene chloride copolymer (saran), nylon, polyethylene terephthalate, ethylene/vinyl alcohol copolymer, etc.

Although product 16 is illustrated as having a maximum height which is below the maximum height of support member 12, i.e., the level at which flange 22 is located, the invention is not limited to such "low profile" products. Rather, "high profile" products may also be packaged in accordance with the present invention, i.e., those having a maximum height which is above the level at which flange 22 is located so that the portion of the product which extends above the level of flange 22 will be in contact with lid 24.

The laminate from which lid 24 is constructed preferably delaminates into a substantially gas-impermeable portion and a gas-permeable portion. When lid 24 is grasped by, e.g., a retail worker at outer edge 40 thereof, preferably at one of the four corners of support member 12, and pulled generally upwards and backwards (i.e., towards an opposite edge or corner of the package), lid 24 delaminates within coextruded, multilayer film 26 as represented by the dashed line 42. Coextruded, multilayer film 26 is preferably a gas-permeable film and/or is perforated to allow atmospheric oxygen to pass therethrough. Thus, by delaminating lid 24 within coextruded, multilayer film 26, not only is gas-impermeable film 28 removed from package 10 to thereby allow atmospheric oxygen to enter the package through coextruded, multilayer film 26 (thus allowing a packaged oxygen-sensitive product to be changed in some desirable way, e.g., causing a packaged fresh red meat product to bloom to a bright red color), but the coextruded, multilayer film 26 is reduced in thickness by virtue of being delaminated, thereby increasing the oxygen permeability of that film to allow for more rapid ingress of oxygen into the cavity 14 of the package 10.

Figure 3:
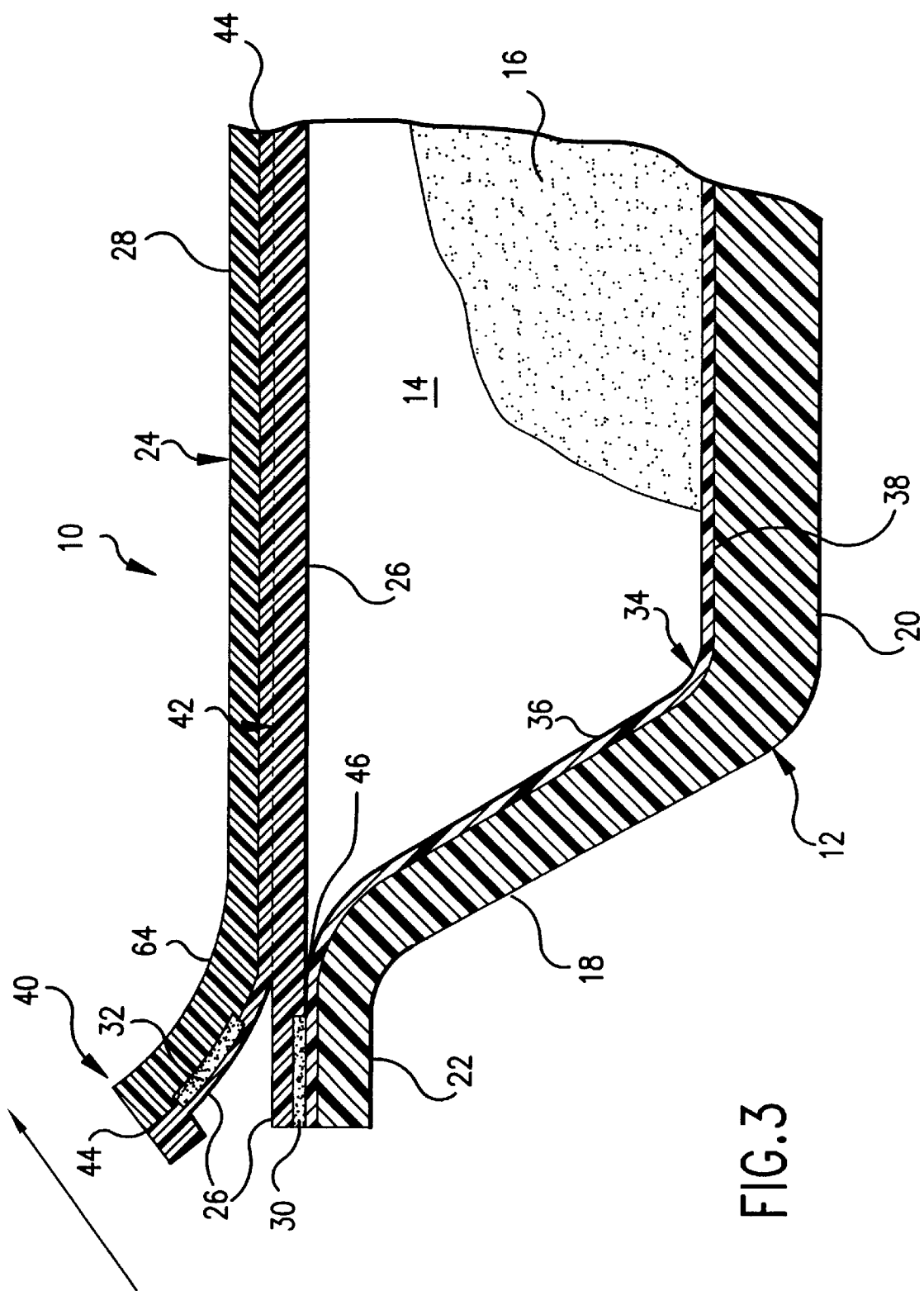
FIG. 3 is an enlarged cross-sectional view of a portion of the package illustrated in FIG. 2, wherein peelable delamination of the lid within the coextruded, multilayer film has been initiated.

FIG. 3 illustrates in greater detail the manner in which the laminate from which lid 24 is constructed delaminates within coextruded, multilayer film 26 when lid 24 is subjected to a peeling force. Coextruded, multilayer film 26 preferably has an intra-film cohesive strength which is lower than: 1) the inter-film bond-strength between the component films of laminate 24 (i.e., between films 26 and 28); 2) the intra-film cohesive strengths of the other films in the laminate (film 28 as presently illustrated); and 3) the bond-strength of heat-weld 30. In this manner, the coextruded, multilayer film component of the laminate internally separates, i.e., delaminates, when the laminate is subjected to a peel force which exceeds the intra-film cohesive strength of the coextruded film. Such intra-film cohesive strength preferably ranges from 0.001 to 2.5 pounds per inch.

Lid 24 is preferably fashioned such that an outer edge 40 thereof extends beyond, i.e., is exterior to, flange 22. In this manner, a retail worker or other person can easily grasp lid 24 at outer edge 40 to effect the delamination of lid 24 by applying a peeling force thereto in the general direction of the arrow in FIG. 3. When this occurs, coextruded, multilayer film 26 begins to delaminate. If the peeling force continues to be applied, lid 24 will continue to delaminate within coextruded, multilayer film 26 along line 42. As shown, all of gas-impermeable film 28 and a portion of coextruded, multilayer film 26 are being removed from package 10 during the delamination process. Lid 24 thus delaminates into a gas-impermeable portion, which is removed from package 10, and a gas-permeable portion which remains bonded to support member 12.

Figure 4:
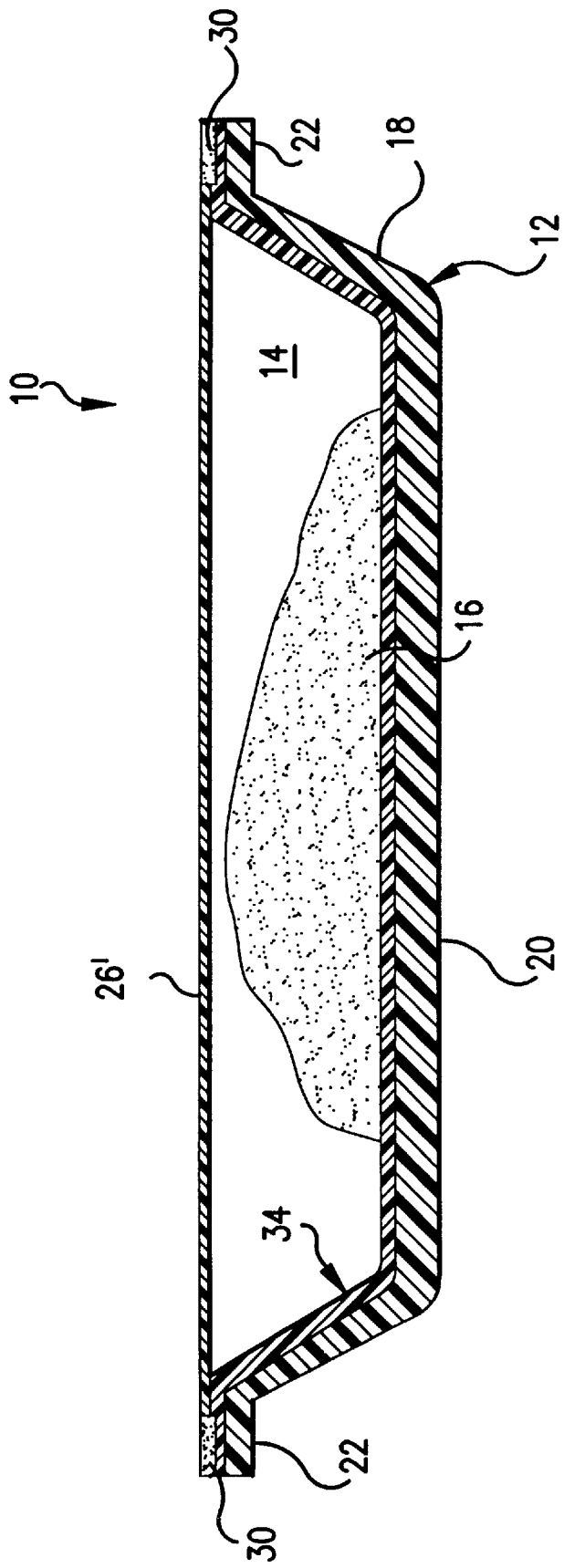
FIG. 4 is a schematic, cross-sectional view the package of FIGS. 2 and 3 wherein the lid has been peelably delaminated such that only a portion of the coextruded, multilayer film remains lidded to the product support member.

The end result of the delamination process is shown in FIG. 4, wherein gas-impermeable film 28 and a portion of coextruded, multilayer film 26 have been removed from package 10 such that only gas-permeable portion 26' of lid 24 remains attached to support member 12. In this manner, product 16 remains fully enclosed within package 10, i.e., gas-permeable portion 26' is still heat-welded to flange 22 of support member 12 via first heat-weld 30 and continues to protect the product from microbial and other contaminates. However, atmospheric oxygen can now enter the cavity 14 of package 10 through the now-exposed gas-permeable portion 26'. Moreover, since the coextruded, gas-permeable film 26 has been rendered thinner by the delamination process, the rate of gas-transmission therethrough increases. If product 16 is a fresh red meat product originally packaged in a gas which is lower in oxygen content than air, the increased rate of gas-transmission through gas-permeable portion 26' results in a faster exchange of atmospheric oxygen for the packaging gas, thereby leading to a more rapid blooming of the fresh red meat product. In this manner, package 10 as shown in FIG. 4 can more rapidly be displayed for consumer purchase, i.e., the delay time in waiting for the fresh red meat product to bloom to an acceptable color of red is reduced. This is an advantageous feature of the present invention.

Figure 5:
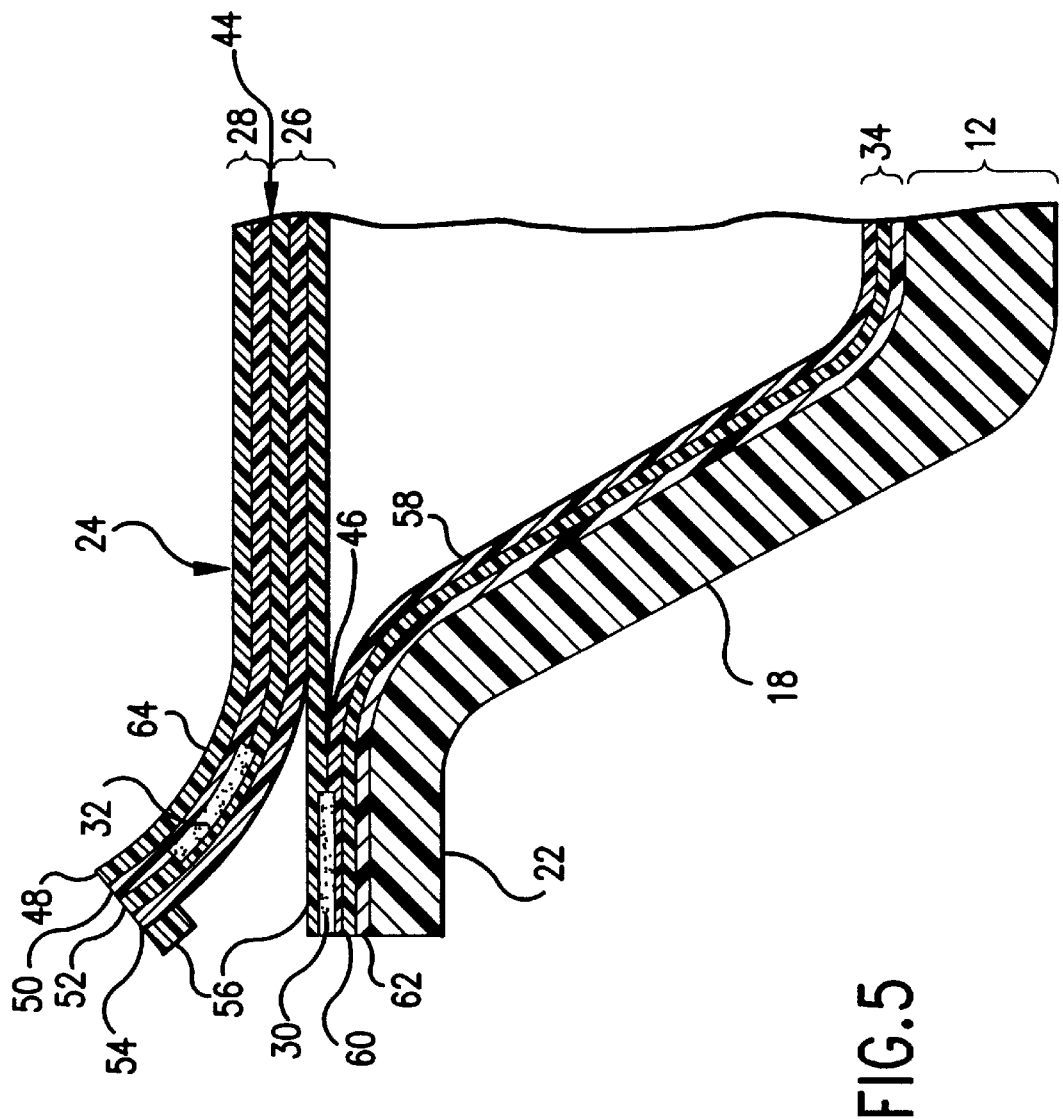
FIG. 5 is an enlarged cross-sectional view of a portion of the package illustrated in FIG. 3.

FIG. 5 illustrates in greater detail the portion of package 10 within the circle set forth in FIG. 3. As shown, gas-impermeable film 28 is preferably at least a two-layer film including oxygen-barrier layer 48 and bonding layer 50; coextruded, multilayer film 26 is preferably at least a three-layer film including first bonding layer 52, interior layer 54, and second bonding layer 56; and sealant film 34 is preferably at least a three-layer film including bonding layer 58, oxygen-barrier layer 60, and bonding layer 62. Each of bonding layers 50 and 52, which are in contact with one another at interface 44 of gas-impermeable film 28 and coextruded, multilayer film 26, preferably comprise materials which can be bonded together by any suitable lamination technique so that films 26 and 28 may be bonded to thereby form laminate (lid) 24. Suitable lamination techniques include, e.g., adhesive bonding; reactive surface modification (e.g., corona treatment, flame treatment, or plasma treatment); heat treatment; pressure treatment; etc., including combinations thereof. A preferred lamination technique is reactive surface modification and, more preferably, corona treatment combined with pressure and, optionally, heat immediately after corona treatment.

In producing laminate 24, one or both surfaces of bonding layers 50, 52 of films 28, 26 are subjected to corona discharge. The amount of corona discharge to which the films are exposed is directly proportional to the amount of power supplied to the corona unit and also the speed at which the films are passed through the unit. Any desired combination of power input to the corona unit and film speed may be employed to achieve a desired bond-strength between the films. Such bond-strength is preferably higher than the intra-film cohesive strength of coextruded, multilayer film 26 so that lid 24 will not delaminate at interface 44 between films 26 and 28 but will, instead, delaminate within coextruded, multilayer film 26. The amount of power to supplied to the corona unit may range, e.g., from about 0.02 to about 0.5 kilowatts (kw) per inch of film width and the film speed through the corona unit may range, e.g., from about 10 to about 2000 feet/minute.

Corona treatment units are commercially available, e.g., from Enercon Industries Corporation of Menomonee Falls, Wis. In such units, a high voltage current, which is passed through an electrode adjacent to the film surface to be treated, ionizes the air to cause reactive surface modification, e.g., oxidation, of the treated film surface. Under the proper circumstances (e.g., the technique used to produce the treated films and the choice of materials for bonding layers 50 and 52 as explained immediately below), the reactively-modified surfaces of layers 50 and 52 will adhere to one another, particularly when films 26 and 28 are subsequently and immediately pressed together, e.g., between a pair of rollers which may optionally be heated to further improve the bond. The completed laminate 24 is then taken up as a roll to be used for providing lids to packages as discussed below.

Accordingly, it is preferred that the materials from which layers 50 and 52 are formed be materials which have a high affinity for one another when subjected to corona treatment. If both coextruded, multilayer film 26 and gas-impermeable film 28 are stretch-oriented films, almost any polyolefin or blend of polyolefins may be employed for layers 52 and 50. The polyolefin may be the same or different in each of the layers. If one or both of films 26 and 28 is not stretch-oriented (but is, instead, a hot blown film, for example), it becomes more difficult to obtain a good corona bond between such films. The inventors have determined, however, that a good corona bond can still be obtained if layers 50 and/or 52 of the non-oriented film(s) includes at least one material selected from the group consisting of ethylene/vinyl acetate copolymer (EVA), ethylene/methacrylate copolymer (EMA), acrylic acid copolymers, methyl acrylic acid copolymers, acrylic acid-modified EVA or EMA, anhydride-modified EVA or EMA, and syndiotactic polymethyl pentene. If one of films 26 or 28 is stretch-oriented and the other is not, the oriented film may include any polyolefin as the compatible interface material. If both films are not stretch-oriented, the interface materials for both films are preferably selected from the above list in order to form a good corona bond.

When films 26 and 28, as well as layers 50 and 52, are formed as set forth above, the inventors have found that a strong corona bond can be formed between films 26 and 28.

Although not shown in FIG. 5, it should be noted from the Examples below that laminate 24 in accordance with the present invention may include three or more component films. Such may be desirable, for example, when coextruded, multilayer film 26 includes therein an anti-fog additive. That is, in order to prevent the accumulation of condensation on the inside surface of film 26 from the packaged food product, it is preferred that film 26 include an anti-fog additive therein. Suitable anti-fog additives include, e.g., polyethoxylated cetyl alcohol, glycerol monostearate, polyoxyethylene (4) nonylphenol, glycerol monooleate, polyoxy ethylene (4) lauryl alcohol, polyoxy ethylene (26) glycerol ether, and polyoxy ethylene (20) sorbitol ether. The inclusion of anti-fog additives in a film, however, has been found to result in weak corona bond between the anti-fog-containing film and another film. Although it may be possible to compensate for the weakness of the bond by increasing the amount of exposure to the corona discharge (by increasing the amount of corona discharge and/or slowing the speed at which the film passes by the corona electrode), such measures may often be too costly and time-consuming for commercial production.

The inventors have discovered that the detrimental effects of an anti-fog additive on corona bond-strength can be substantially reduced by the inclusion of an intermediate film between the two films which are desired to be bonded, wherein the intermediate film contains no anti-fog additive and wherein both the intermediate film and the anti-fog-containing film are formed from, or include exterior layers at the interface of the two films which are formed from, materials which have a high affinity for one another when subjected to corona treatment ("interface materials"). If both the intermediate film and the anti-fog-containing film are stretch-oriented films, almost any polyolefin or blend of polyolefins may be employed at the interface of the two films as the interface materials. In this regard, the polyolefin may be the same or different in each of the films. If one or both of the films is not stretch-oriented (but is, instead, a hot blown film, for example), the interface material of the non-oriented film(s) preferably includes at least one material selected from the group consisting of ethylene/vinyl acetate copolymer (EVA), ethylene/methacrylate copolymer (EMA), acrylic acid copolymers, methyl acrylic acid copolymers, acrylic acid-modified EVA or EMA, anhydride-modified EVA or EMA, and syndiotactic polymethyl pentene. If one of the films is stretch-oriented and the other is not, the oriented film may include any polyolefin as the interface material. If both films are not stretch-oriented, the interface materials for both films are preferably selected from the above list in order to form a good corona bond.

Accordingly, the strength of the corona bond between the two films is improved despite the presence of anti-fog additive in one of the films. Thus, when an anti-fog additive is included in film 26, it is preferred that a third, intermediate film be included between films 28 and 26. The intermediate film may, if desired, have the same composition as film 26 except that the intermediate film would not contain anti-fog additive. Another reason to include an intermediate film in laminate 26 is to provide a relatively symmetrical laminate structure which precludes curling. The intermediate film may have any desired film thickness, e.g., ranging from about 0.3 mil to about 5 mils and, more preferably, from about 0.5 mil to about 1 mil.

Preferably, bonding layers 50 and 52 further comprise at least one material which is capable of forming a heat-weld with the other material so that heat-weld 32 is formed when lid 24 is heat-sealed to support member 12. In this manner, the bond-strength between films 26 and 28 will be increased over that provided by lamination (e.g., by corona treatment) to further ensure that lid 24 delaminates within coextruded, multilayer film 26. Similarly, each of bonding layers 56 and 58, which are in contact with one another at interface 46 of coextruded, multilayer film 26 and sealant film 34, preferably comprise at least one material which is capable of forming a heat-weld with the other material. (Such materials which are capable of forming a heat-weld with one another are hereinafter referred to as "compatible materials.") In this manner, when sufficient heat and pressure are applied to films 26, 28, and 34 on flange 22 of support member 12, heat-weld 30 and, optionally, 32 are formed.

Preferred examples of compatible materials for inclusion in bonding layers 50/52 and 56/58 include polyethylene homopolymers such as, e.g., low density polyethylene or high density polyethylene, and polyethylene copolymers such as, e.g., ethylene/alpha-olefin copolymers. The same polyethylene or a different polyethylene may be included in adjacent layers 50/52 and 56/58, provided that the polyethylenes chosen for inclusion in such adjacent layers are capable of forming heat-welds with one another across interfaces 44 and 46, respectively. Other compatible materials, e.g., polypropylenes or other polyolefins, such as ethylene/vinyl acetate, ethylene/butyl acrylate, ionomers, etc., may also be employed as desired.

Heat-welds 30 and 32 are preferably formed simultaneously by applying heat and pressure to the upper surface 64 of lid 24 in the areas where the heat-welds are desired to be formed, preferably peripherally around flange 22 to completely enclose product 16 within package 10. Any conventional heating element may be used to effect the heat-welds, e.g., a heated metal element having a contact surface which essentially mirrors the shape of, but has a slightly narrower width than, peripheral flange 22. After lid 24 has been placed over support member 12 as shown in FIG. 2, the heated metal element is pressed into contact with the upper surface 64 of lid 24 to thereby squeeze lid 24 between the heated element and flange 22 of support member 12. The amount of heat and pressure which are necessary to effect heat-welds 30 and 32 are dependent upon a number of factors, e.g., the thickness and composition of lid 24, and can readily be determined by one having ordinary skill in the art to which this invention pertains.

The heat and pressure which are applied to the upper surface 64 of lid 24 are preferably sufficient to cause simultaneous heat-welding of all adjacent layers comprising materials which are compatible with one another. In this manner, such adjacent layers are fused together via heat-welds throughout the cross-sectional thickness of lid 24 in the area beneath the contact surface of the heated element. As shown, heat-weld 32 extends into and bonds layers 50 and 52 across interface 44, but could also extend into layer 48 if that layer contains a material which is compatible with one or more materials from which layer 50 is formed. If films 26 and 28 are bonded with an adhesive to form lid 24 prior to being heat-welded to support member 12, layers 50 and 52 are preferably compatible with the adhesive material (not shown) so that any such adhesive bond is not weakened by heat-welding. In most cases, it is believed that a single or separate heat-welds will form between layers 50, 52 and the adhesive layer to thereby strengthen the bond between films 26 and 28 in the area of flange 22.

Heat-weld 30 extends into and bonds layers 56 and 58 across interface 46, and may also extend into layers 54 and/or 60 and/or 62 as desired, depending upon whether those layers are formed from materials which are compatible with one another.

Preferably, layers 54 and 56 comprise materials which are not compatible with one another so that no heat-weld, or a relatively weak heat-weld, is formed across those layers. More preferably, layers 54 and 56 separate from one another when lid 24 is subjected to a peel force ranging from 0.001 to 2.5 pounds per inch (more preferred peel force ranges are set forth below). That is, the inter-layer adhesion between layers 54 and 56 is preferably such that the two layers will peelably separate from one another at a peel force ranging from 0.001 to 2.5 pounds per inch. The inter-layer adhesion between layers 54 and 56 preferably represents not only the weakest component of the intra-film cohesive strength of coextruded, multilayer film 26, but also the weakest cohesive or adhesive bond within the laminate from which lid 24 is formed, both before and after heat-welds 30 and 32 have been formed. In this fashion, when lid 24 is subjected to a peel force ranging from 0.001 to 2.5 pounds per inch, such peel force is channeled into coextruded, multilayer film 26 at the interface of layers 54 and 56, whereupon the lid delaminates within the coextruded, multilayer film. As shown, layers 52 and 54 of coextruded, multilayer film 26 is peelably removed from package 10 along with layers 48 and 50 of gas-impermeable film 28. Layer 56 of coextruded, multilayer film 26, however, remains attached to support member 12 so that product 16 remains enclosed within package 10.

Peelable separation of adjacent film layers 54 and 56 can be achieved by constructing coextruded, multilayer film 26 such that one of layers 54 or 56 comprises a non-polar material while the other adjacent layer comprises a polar material. For example, one of adjacent layers 54 or 56 may comprise non-polar polyethylene homopolymer or copolymer while the other adjacent layer comprises at least one material selected from the group consisting of polyamide, copolyamide, polyester, copolyester such as polyethylene terephthalate, polar polyethylene copolymers such as ethylene/vinyl alcohol, polycarbonate, polymethylpentene, polyvinylidene chloride copolymer, polyurethane, polybutylene homopolymer and copolymer, and polysulfone. Suitable examples of such materials are listed in the Examples below. Alternatively, one of layers 54 or 56 may comprise polyethylene homopolymer or copolymer while the other adjacent layer comprises polypropylene homopolymer or copolymer.

It should also be noted that the inter-layer adhesion between adjacent layers 54 and 56 may be increased or decreased as desired by the inclusion of additives into one or both layers which serve to promote or defeat adhesion between such layers. An adhesion-promoting additive may be added, for example, to prevent coextruded, multilayer film 26 from prematurely delaminating at the layer 54/56 interface (i.e., when the inter-layer adhesion between such layers would otherwise be unacceptably low). Examples of adhesion-promoting additives include, e.g., anhydride-modified or acid-modified polyolefins. Adhesion-defeating additives may be included in either or both of layers 54 or 56 when the inter-layer adhesion between such layers is unacceptably high, e.g., such that remaining layer 56 of coextruded, multilayer film 26 is susceptible to being torn during peelable delamination of lid 24. Examples of adhesion-defeating additives include, e.g., teflon, anti-block agents (e.g., silica, clay, or glass beads), anti-fog agents, etc. When one of layers 54 and 56 comprises a non-polar material while the other layer comprises a polar material, adhesion between such layers can also be varied by adding materials to one or both layers which are more or less polar than the material from which the layer has been formed.

It is to be understood that layers 54 and 56 are merely illustrative, and that any two adjacent layers within coextruded, multilayer film 26 may be designed for delamination at the interface therebetween by proper selection of the materials from which such layers are formed in accordance with the above description.

As an alternative to providing for inter-layer adhesive separation as a means of achieving delamination within coextruded, multilayer film 26, the coextruded, multilayer film may comprises at least one layer which internally separates when the lid is subjected to a peel force ranging from 0.001 to 2.5 pounds per inch.

A combination of inter-layer adhesive failure and intra-layer cohesive failure within coextruded, multilayer film 26 may also be employed, if desired, as a means of achieving preferential delamination of such film. This can occur, e.g., when the primary plane of delamination is between two adjacent film layers but the delamination path "wanders" into one or both of the adjacent film layers.

As mentioned above, coextruded, multilayer film 26 preferably delaminates when lid 24 is subjected to a peel force ranging from 0.001 to 2.5 pounds per inch, i.e., the intra-film cohesive strength of coextruded, multilayer film 26 preferably ranges from a low of about 0.001 pounds per inch to a high of about 2.5 pounds per inch. A more preferred peel force for delamination of coextruded, multilayer film 26 is between 0.005 and 2 lb/inch and, more preferably, between 0.01 and 1.5 lb/inch. Peel initiation (the peel force required to begin delamination) preferably ranges from 0.5–2.5 lb/inch while peel delamination (the "steady-state" peel force after peel initiation) preferably ranges from 0.01–1.0 lb/inch. A peel force falling within the foregoing ranges provides a balance between sufficient adhesion to prevent premature separation during manufacture, shipping and storage, and sufficient peelability so that coextruded, multilayer film 26 can be delaminated without tearing or otherwise compromising the integrity of remaining portion 26' thereof. That is, a peel force of more than about 2.5 lb/inch results in a lidding film which tears or is difficult to peel. On the other hand, a peel force of less than about 0.001 lb/inch creates a greater likelihood of premature delamination.

Referring still to FIG. 5, oxygen-barrier layers 48 and 60 preferably comprise a material which provides a substantial barrier to the passage of gas, particularly oxygen, therethrough so that films 28 and 34 are substantially gas-impermeable. Suitable materials include, e.g., vinylidene chloride copolymer (saran), nylon, polyethylene terephthalate, ethylene/vinyl alcohol copolymer, silicon oxides (SiOx), etc. Other materials may be employed in layers 48 and 60 as necessary or desired.

Gas-impermeable film 28 and sealant film 34 may be cast, hot-blown, or oriented films formed from or containing one or more layers formed from one or more of the above-listed oxygen-barrier materials. Alternatively, films 28 or 34 may comprise a film coated with an oxygen-barrier material such as SiOx-coated PET or saran-coated PET. SiOx-coated PET may be obtained, e.g., under the tradename Simplicity™ by PC Materials of Mount Bethel, Pa. ("SiOx" is a silicon oxide where "ax" typically ranges from 0.5 to 4.) The SiOx coating on the PET or other substrate generally has a thickness ranging from about 50 to about 2000 angstroms. A saran coating typically ranges in thickness from about 1 to about 10 microns.

Bonding layer 62 preferably comprises a material which is capable of forming a bond with the material from which support member 12 is formed in accordance with the teachings set forth in the above-referenced U.S. Pat. Nos. 4,847, 148 and 4,935,089, and U.S. Ser. No. 08/326,176, filed Oct. 19, 1994 and entitled "Film/Substrate Composite Material."

Each of films 26, 28 and 34 may have any desired thickness, ranging, e.g., from about 0.3 mils to about 12 mils. Preferably, the films range in thickness from about 0.5 mils to about 8 mils; more preferably from about 0.75 mils to about 5 mils; most preferably from about 1 to about 3 mils.

The above-described laminate and film structures as shown in FIG. 5 are intended to be illustrative only and not in any way limiting in scope of the present invention. A greater or lesser number of films or film layers may be included as desired or necessary. Specific laminates and delaminatable multilayer, coextruded films are illustrated in the Examples below.

Figure 6:
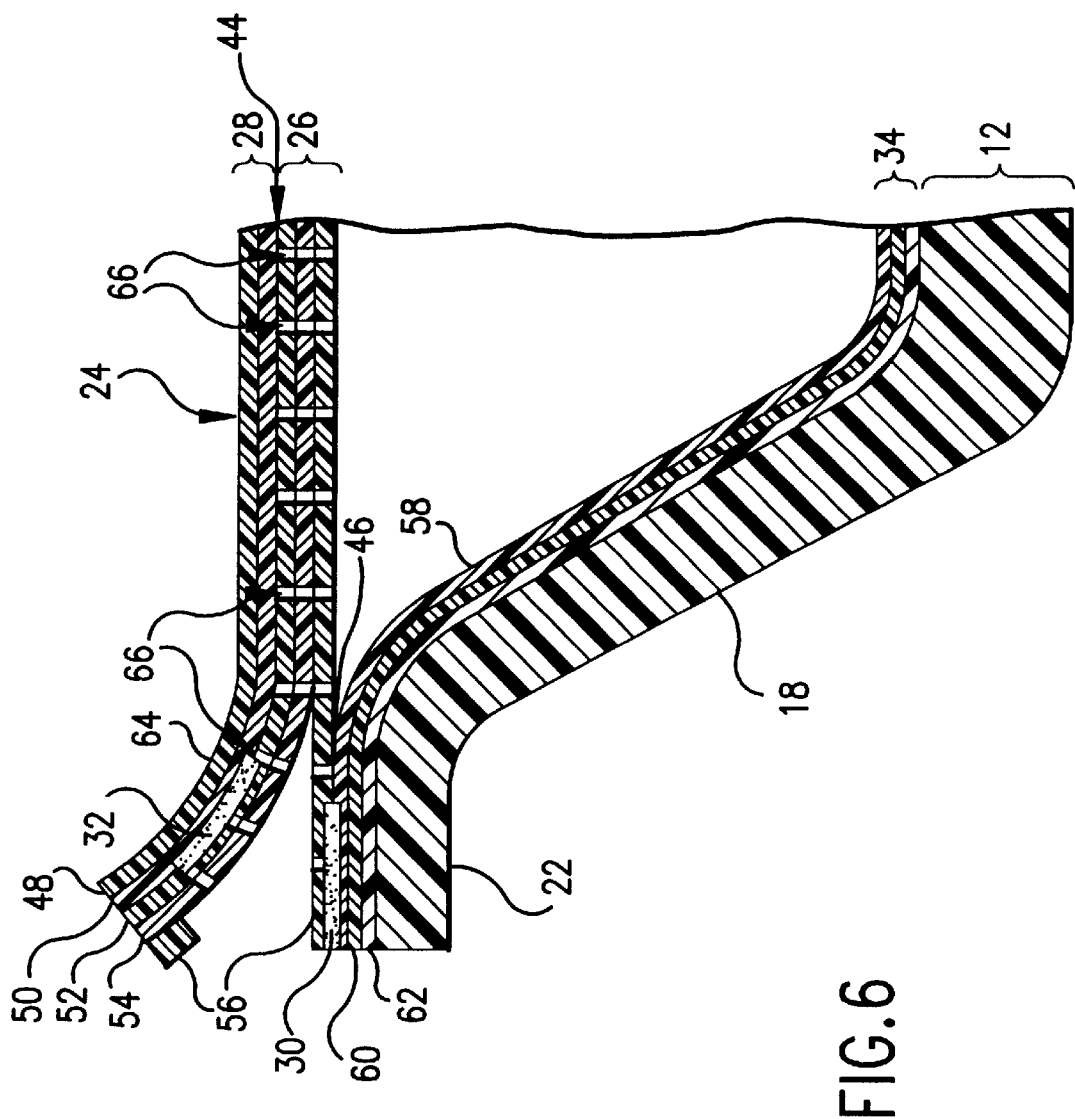
FIG. 6 illustrates another embodiment of the present invention and is similar to FIG. 5 except that the coextruded, multilayer film is perforated.

In a particularly preferred embodiment of the present invention, coextruded, multilayer film 26 is perforated as shown in FIG. 6. Perforations 66 are preferably formed in coextruded, multilayer film 26 prior to bonding film 26 to gas-impermeable film 28. The perforations preferably extend completely through coextruded, multilayer film 26 to form a passageway therethrough which extends from one major surface of the film to the other major surface. As shown in FIG. 6, when coextruded, multilayer film 26 is delaminated, each of the perforations is separated into two portions along the interface between layers 54 and 56 of coextruded, multilayer film 26. One portion extends through layers 52 and 54 and is removed from the package with those layers, along with layers 48 and 50 of gas-impermeable film 28, when such layers are peeled from package 10. The other portion of the perforations extends through layer 56 of coextruded, multilayer film 26, and therefore remains with package 10 along with layer 56 after lid 24 has been delaminated.

Figure 7:
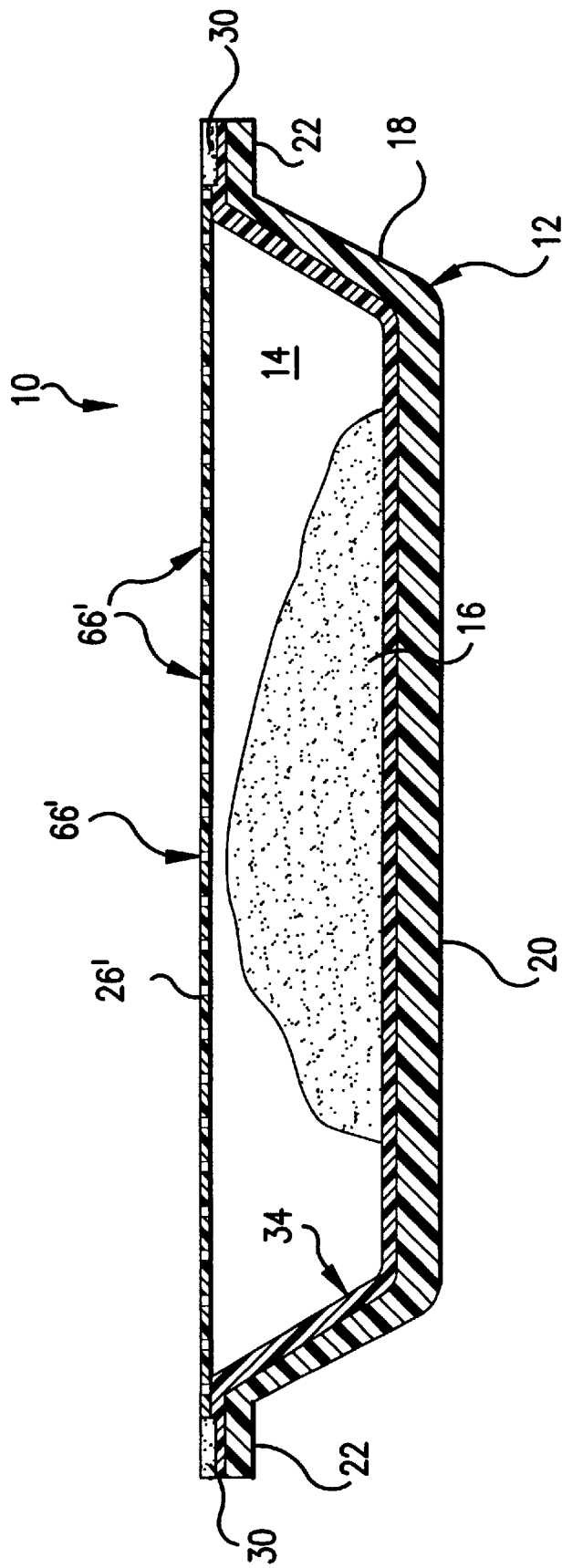
FIG. 7 is identical to FIG. 4 except that the portion of the coextruded, multilayer film remaining lidded to the product support member is perforated.

The resultant package after lid 24 has been delaminated is shown in FIG. 7, wherein gas-permeable portion 26' of coextruded, multilayer film 26, which remains bonded to support member 12, includes the remaining portion of perforations 66 (designated as 66'). At this point (e.g., just prior to placing package 10 in a retail display case for customer purchase), perforations 66' are fully exposed to the atmosphere so that atmospheric oxygen can enter the package through perforations 66'. Preferably, coextruded, multilayer film 26 is itself a gas-permeable material so that atmospheric oxygen can enter into the package through the film as well as through the perforations. In this manner, the package 10 in accordance with the present invention provides for swift ingress of atmospheric oxygen into the cavity 14 to, e.g., cause a packaged fresh red meat product to bloom in a desirably short period of time (preferably within about 45 minutes after lid 24 has been delaminated). At the same time, prior to the delamination of lid 24, perforations 66 (and 66') are enclosed by gas-impermeable film 28 and are thereby prevented from allowing the passage of gas into or out of package 10 so that the package remains substantially gas-impermeable for as long as desired.

Perforations 66 preferably range from about 5 to about 250 microns in diameter, more preferably 25 to 125 microns, and most preferably 75 to 100 microns in diameter. Ideally, the perforations are large enough to permit the passage of atmospheric gas therethrough (oxygen, nitrogen, carbon dioxide), but small enough to prevent the passage of liquids or dirt. The perforations may be formed by any suitable means, including the use of mechanical, chemical, or electrical devices. Non-limiting examples of such devices include those which perforate with laser energy, electrostatic discharge, ultrasonic waves, flame discharge, needles or other sharp objects, or combinations thereof. Preferred devices are those which produce laser energy or electrostatic discharge. An electrostatic discharge device operates by passing a film between a pair of electrodes and transmitting electricity to one of the electrodes in sufficient voltage that the electrode discharges through the film and to the other electrode, thereby perforating the film.

Having now described a preferred package in accordance with the present invention, a preferred method for making such package will be discussed. Referring generally to FIGS. 1–4, a preferred method begins with providing a product support member 12 and placing in the cavity 14 thereof a product 16, preferably a fresh red meat product such as, beef, veal, lamb, pork, venison, etc. Lid 24 is then placed over the product-containing support member and heat-sealed to the flange 22 thereof as described above, thereby enclosing the product within the cavity. Lid 24 is preferably supplied from a larger web of the laminate, e.g., from a roll which is unwound to supply material as needed, by placing the web (not shown) over support member 12 and severing lid 24 from the web after or simultaneously with the heat-welding of the lid to the support member. Lid 24 can be severed from the web in this manner with any conventional cutting device, e.g., a sharp cutting instrument or a thermal cutting device such as a heated wire or heated blade.

A packaging method in accordance with the present invention preferably includes, prior to enclosing the product within the support member, the step of at least partially evacuating the cavity of air and then at least partially filling the cavity with a gas which is lower in oxygen content than air. Any desired amount of air may be removed from the enclosure during the evacuation step, e.g., ranging from 1% to 99.999% by volume. In the case where a fresh red meat product is to be packaged, the amount of air removed preferably ranges from about 99% to about 99.999%, and more preferably from about 99.5% to about 99.999% by volume. Preferred gases to replace the evacuated air include, e.g., carbon dioxide, nitrogen, argon, etc., and mixtures of such gases. As a result of these steps, the cavity 14 of package 10 will preferably contain, prior to delamination of lid 24, less than 1% oxygen by volume, more preferably less than 0.5% oxygen, even more preferably less than 0.1% oxygen, and most preferably, less than 0.05% oxygen by volume, with the balance comprising a gas or mixture of gases, such as a mixture of carbon dioxide and nitrogen. When package 10 provides a substantially gas-impermeable enclosure, such a modified-atmosphere packaging environment ensures that a packaged fresh red meat product will have a shelf-life of at least seven days, more preferably at least ten days and, even more preferably at least fourteen days, and most preferably at least twenty one days (assuming, of course, that the package is maintained under refrigerated conditions, e.g., at temperatures ranging from about 28° F. to about 48° F.).

As mentioned above, when a fresh red meat product is maintained in a low-oxygen environment, it has a purple color which is aesthetically unappealing to most consumers. Thus, the final preferred step (or one of the final steps) in a packaging method according the present invention is to peelably remove gas-impermeable film 28 and a portion of coextruded, multilayer film 26 from lid 24, whereby air enters cavity 14 through the remaining, gas-permeable portion 26' of coextruded, multilayer film 26 and displaces at least some of the gas which is lower in oxygen content than air. In this manner, atmospheric oxygen is permitted to come into contact with the packaged fresh red meat product and cause it to bloom to a bright red color which consumers associate with freshness.

The invention may be further understood by reference to the following examples, which are provided for the purpose of representation, and are not to be construed as limiting the scope of the invention.

EXAMPLES

Laminates produced in accordance with the present invention are set forth in the Examples below. The following materials were employed:

PE: a layer comprising a blend of
- 50 wt. % of an ethylene/1-octene copolymer with a density of 0.920 gm/cc, a melt flow index of 1.0, and an octene-1 content of 6.5% by weight; available from Dow as Dowlex™ 2045;
- 25 wt. % of an ethylene/octene-1 copolymer with a density of 0.935 gm/cc., a melt flow index of 2.5, and an octene-1 comonomer content of 2.5%; available from Dow as Dowlex 2037™; and
- 25 wt. % of an ethylene/vinyl acetate copolymer having 3.3 percent by weight of vinyl acetate, a melt flow index of 2.0, and a density of 0.92 g/cc; obtained from the Rexene Corporation of Dallas, Tex. under the tradename PE 1335.

"PE" also contains anti-fog additives (mono & diglycerides and propylene glycol) and an anti-block additive (anhydrous sodium silicate).

EVA1: Escorene™ LD-318.92, an ethylene vinyl acetate copolymer having 9 percent by weight of vinyl acetate, a density of 0.93 g/cc and a 2.0 MELT FLOW INDEX, supplied by Exxon.

EVA2: Elvax (™) 3182-2; an ethylene vinyl acetate copolymer having 28 percent by weight vinyl acetate and a 2 MELT FLOW INDEX; supplied by DuPont.

EVA3: ELVAX 3165 (™) ethylene/vinyl acetate copolymer having 18 percent by weight of vinyl acetate, a melt index of 0.7 and a density of 0.94 g/cc; obtained from Dupont.

EVA4: PE 1335; an ethylene/vinyl acetate copolymer having 3.3 percent by weight of vinyl acetate, a melt flow index of 2.0, and a density of 0.92 g/cc; obtained from the Rexene Corporation.

EVA5: PE 1375; an ethylene/vinyl acetate copolymer having 3.6 percent by weight of vinyl acetate, a melt flow index of 2.0, and a density of 0.92 g/cc; obtained from the Rexene Corporation.

EMA: EMAC™ SP 2205; ethylene/methyl acrylate copolymer having 20 wt. % methyl acrylate and a 2.0 MELT FLOW INDEX; supplied by Chevron.

PETG: Eastar™ 6763; polyethylene terephthalate glycol produced from the condensation reaction of ethylene terephthalic acid cyclohexanedimethanol and ethylene glycol; supplied by Eastman Chemical.

TIE1: Bynel™ CXA E 361; an anhydride-modified ethylene/vinyl acetate copolymer having a 2.0 MELT FLOW INDEX; supplied by DuPont.

TIE2: Bynel™ CXA 4104; an anhydride-modified polyolefin in ethylene/butene copolymer (6 wt. % butene) having a MELT FLOW INDEX ranging from 0.9–1.5 and a melting point of 127° C.; supplied by DuPont.

TIE3: TYMOR™ 1203; anhydride-grafted linear low density polyethylene having a melt index of 1.6 and a density of 0.910 g/cc; obtained from Morton International of Chicago, Ill.

TIE4: Bynel™ 50E555; an anhydride-grafted polypropylene homopolymer having a 5.0 MELT FLOW INDEX, a density of 0.9 g/cc, and a melting point of 166° C.; supplied by DuPont.

LLDPE1: Dowlex 2045.04 (™), a heterogeneous ethylene/octene copolymer having an octene content of 6.5 wt. %, a density of 0.920 g/cc and a 1.0 MELT FLOW INDEX; supplied by the Dow Chemical Co.

LLDPE2: DOWLEX 2244A (™) heterogeneous ethylene/octene copolymer having a melt index of 3.3 and a density of 0.916 g/cc; obtained from The Dow Chemical Co.

LLDPE3: Dowlex 2045.03 (™), a heterogeneous ethylene/octene copolymer having an octene content of 6.5 wt. %, a density of 0.920 g/cc and a 1.1 MELT FLOW INDEX; supplied by the Dow Chemical Co.

LMDPE: Dowlex 2037 (™), a heterogeneous ethylene/octene copolymer having an octene content of 2.5 wt. %, a density of 0.935 g/cc and a 2.5 MELT FLOW INDEX; supplied by the Dow Chemical Co.

LDPE: NA 345-013; a low density polyethylene having a 1.8 MELT FLOW INDEX, a 113° C. MP, and a density of 0.922 g/cc; supplied by Quantum/USI.

SiOx/PET: Simplicity™; an oriented and heat-set polyethylene terephthalate film which is vapor-deposition-coated on one side thereof with a layer of silicon oxide; supplied by PC Materials.

SARAN/PET: Type 50 M44 Mylarm™; an oriented and heat-set polyethylene terephthalate film which is suspension coated on one side thereof with a layer of polyvinylidene chloride copolymer (saran); supplied by DuPont.

EVOH1: EVAL™ LC-E 105A; an ethylene/vinyl alcohol copolymer having 44 mole % ethylene and a melting point of 166.5° C.; supplied by Eval of America.

EVOH2: EVAL™ LC-F101A; an ethylene/vinyl alcohol copolymer having 32 mole % ethylene, a melting point of 181° C., a MELT FLOW INDEX of 1.6; supplied by Eval of America.

EVOH3: LC-H101BD (™) ethylene/vinyl alcohol copolymer having 38 mole percent of ethylene, a melt index of 1.5 and a melt point of 175° C.; obtained from EVAL Co. of America.

EVOH4: EVAL™ LC E151A; ethylene/vinyl alcohol copolymer having 44 mole percent ethylene, a melt index of 1.6 and a melt point of 165° C.; obtained from EVAL Co. of America.

PA1: EMS™ XE 3303; nylon 66,610 copolymer (obtained from Emser).

PA2: 80 wt. % Ultramid™ C-35 nylon 6/66 copolymer having a melting point of 196° C. (obtained from BASF)+20 wt. % Grilon™ CF6S nylon 6/12 copolymer having a melting point of 130° C. (obtained from Emser).

PA3: Ultramid™ B4; nylon 6 polymer having a melting point of 220° C. (obtained from BASF).

PA4: Grilon™ CF6S nylon 6/12 copolymer having a melting point of 130° C. (obtained from Emser).

PP1: Escorene™ PD-3345.E5; a polypropylene homopolymer having a melting point of 161° C. and a melt index ranging from 29–37 (cond. L); supplied by Exxon.

PP2: Escorene™ PD-4062.E7; a polypropylene homopolymer having a melting point of 163° C., a density of 0.9 g/cc, and a melt index of 3.6; supplied by Exxon.

PPMB: a polypropylene-base masterbatch comprising a blend of
  90 wt. % PP2;
  4 wt. % Kaopolite SPO-A; an antiblock additive containing kaolin and fatty amide waxes;
  6 wt. % slip additives (amides of eurucic and behenic acids and N,N'-ethylene-bis-stearamide) and processing aids (calcium stearate)
PEC: PD-9302.E1; a propylene/ethylene copolymer having a melting point of 139° C., a melt index ranging from 3.2–4.4, and containing 3.3 wt. % ethylene; supplied by Exxon.
PB: Duraflex™ 300; butylene homopolymer having a MELT FLOW INDEX of 4, a density of 0.915 g/cc, and a MP 125° C.; obtained from Shell.
SBC: KK36™ styrene/butadiene copolymer having 75 percent by weight of styrene, a melt index of 8.0 (Condition G of ASTM D-1238) and a density of 1.01 g/cc, obtained from Phillips 66, of Pasadena, Tex.

For each of the multilayer film and laminate structures shown in the Examples, single slashes (/) indicate an intra-film (i.e., layer/layer) interface; underlined single slashes (/) indicate a peelable intra-film interface; and double slashes (//) indicate an inter-film (i.e., film/film) interface. Unless otherwise indicated, the laminates were formed by corona treating each film surface which will be present at an inter-film interface and pressing the films together by a pair of nip rollers. Either a SS155 or a SS2544 corona treatment unit from Enercon Industries Corp. was used to provide the corona treatment. The units were operated at 0.11–0.13 kw/in, and film speeds through the units varied from 50 to 150 feet per minute.

Unless otherwise noted (e.g., SiOx/PET and SARAN/PET are described above), the films bracketed by a pair of asterisks (* *) are coextruded, multilayer films which were biaxially oriented, while the films bracketed by a pair of arrows (< >) are coextruded, multilayer films which were hot-blown (i.e., contain substantially no stretch-orientation). Films which are further bracketed by a pair of (# #) have been microperforated via electrostatic discharge (Examples 1–6 and 34).

Example 1

*PE/EVA1/PETG/TIE1/LLDPE1/LMDPE*#//<EMA/LDPE/EMA>//)SiOx/PET
(2.35 mils thickness)

Example 2

*PE/EVA1/PETG/TIE1/LLDPE1/LMDPE*#//<EMA/LDPE/EMA>//)SARAN/PET
(2.35 mils thickness)

Example 3

*PE/EVA1/PETG/TIE1/LLDPE1/25% LMDPE+25% EMA+50% LLDPE1*#//<EMA/PE/EMA>//SARAN/PET
(2.35 mils thickness)

Example 4

*PE/EVA1/PETG/TIE1/LLDPE1/25% LMDPE+25% EMA+50% LLDPE1*#//<EMA/LDPE/TIE1/EVOH1/TIE1/EVA2/PP1>
(3.6 mils thickness)

Example 5

*PE/EVA1/PETG/TIE1/LLDPE1/LMDPE*#//<EMA/LDPE/TIE1/)EVOH1/TIE1/EVA2/PP1>
(3.6 mils thickness)

Example 6

*PE/EVA1/PETG/TIE1/LLDPE1/LMDPE*#//<EMA/LDPE/EMA>//*PE/)/TIE2/EVOH2/TIE2/PE*
(2.85 mils thickness)

Example 7

<PE/EVA1/PETG/TIE1/EVA1/TIE1/EMA>//<EMA/LDPE/TIE1/EVOH1)/TIE1/EVA2/PP1>
(3.5 mils thickness)

Example 8

<PE/EVA1/PETG/TIE1/EVA1/TIE1/EMA>//<EMA/LDPE/TIE1/EVOH1/TIE1/EVA2/PP1>
(4.5 mils thickness)

Example 9

<PE/EVA1/PETG/TIE1/EVA1/TIE1/EMA>//SiOx/PET
(2.75 mils thickness)

Example 10

<PE/EVA1/PETG/TIE1/EVA1/TIE1/EMA>//SiOx/PET
(1.75 mils thickness)

Example 11

<PE/EVA1/PETG/TIE1/EVA1/TIE1/EMA>//SARAN/PET
(1.75 mils thickness)

Example 12

<PE/EVA1/PETG/TIE1/EVA1/TIE1/EMA>//SARAN/PET
(1.75 mils thickness)

Example 13

*PE/EVA1/PETG/TIE1/LLDPE1/EVA1/EVA4*//SiOx/PET
(1.5 mils thickness)

Example 14

*PE/EVA1/PETG/TIE1/LLDPE1/EVA1/EVA4*//SARAN/PET
(1.5 mils thickness)

Example 15

Each of the foregoing laminates of Examples 1–14 was successfully delaminated at the indicated peelable intra-film interface (i.e., within one of the coextruded, multilayer films of the laminate) by applying a piece of masking tape to each of the major surfaces of the laminate (adhesive side of the tape in contact with the laminate) and pulling with sufficient peel force to overcome the intra-film cohesive force of the coextruded, multilayer film having the indicated peelable interface.

Example 16

A delaminatable, coextruded, multilayer film in accordance with the present invention was prepared (biaxially-oriented) and had the following structure:

LMDPE/LLDPE1/TIE1/PETG/PE
(1.1 mils thickness)

Example 17

A delaminatable, coextruded, multilayer film in accordance with the present invention was prepared (biaxially-oriented) and had the following structure:

LMDPE/LLDPE1/TIE1/PA1/JPE
(1.1 mils thickness)

Example 18

A delaminatable, coextruded, multilayer film in accordance with the present invention was prepared (biaxially-oriented) and had the following structure:

LMDPE/LLDPE1/TIE1/PA2/PE
(1.1 mils thickness)

Example 19

A delaminatable, coextruded, multilayer film in accordance with the present invention was prepared (biaxially-oriented) and had the following structure:

LMDPE/LLDPE1/TIE1/PA1/EVA1/PE
(1.1 mils thickness)

Example 20

A delaminatable, coextruded, multilayer film in accordance with the present invention was prepared (biaxially-oriented) and had the following structure:

35% LLDPE1+15% LMDPE+50% EMA/LLDPE1/TIE1/PA1/EVA1/PE
(1.1 mils thickness)

Example 21

A delaminatable, coextruded, multilayer film in accordance with the present invention was prepared (biaxially-oriented) and had the following structure:

35% LLDPE1+15% LMDPE+50% EMA/LLDPE1/TIE1/PA2/EVA1/PE
(1.1 mils thickness)

Example 22

Each of the films of Examples 16–21 were successfully delaminated at the indicated peelable interface by applying a piece of masking tape to each of the major surfaces of the film (adhesive side of the tape in contact with the laminate) and pulling with sufficient peel force to overcome the intra-film cohesive force of the film.

The films are preferably corona-laminated, at the layer opposite the "PE" layer, to a substantially gas-impermeable film, such as SiOx/PET, SARAN/PET, or a hot-blown, cast, or biaxially-oriented film containing an oxygen barrier material such as PVDC or EVOH. The resulting laminate is then heat-sealed to a product support member to form a package, with the "PE" layer being in contact with and bonded to the product support member.

Example 23

A delaminatable, coextruded, multilayer film in accordance with the present invention was prepared (biaxially-oriented) and had the following structure (1/1/1 layer ratio):

PEC/LLDPE3/PEC
(approx. 1 mil in thickness, peels at both intra-film interfaces)

Example 24

A delaminatable, coextruded, multilayer film in accordance with the present invention was prepared (biaxially-oriented) and had the following structure (1/1/1 layer ratio):

50% LLDPE1+25% LMDPE+25% EVA4/72.5% PEC+12.5% PPMB+15% PB/PE
(approx. 1 mil in thickness)

Example 25

A delaminatable, coextruded, multilayer film in accordance with the present invention was prepared (biaxially-oriented) and had the following structure (1/2/1 layer ratio):

50% LLDPE1+25% LMDPE+25% EVA4/87.5% PEC+12.5% PPMB/PE
(approx. 1 mil. in thickness)

Example 26

A delaminatable, coextruded, multilayer film in accordance with the present invention was prepared (biaxially-oriented) and had the following structure (1/1/1 layer ratio):

50% LLDPE1+25% LMDPE+25% EVA4/87.5% PEC+12.5% PPMB/PE
(approx. 1 mil in thickness)

Example 27

Each of the films of Examples 23–26 were successfully delaminated at the indicated peelable interface by applying a piece of masking tape to each of the major surfaces of the film (adhesive side of the tape in contact with the laminate) and pulling with sufficient peel force to overcome the intra-film cohesive force of the film.

The films are preferably corona-laminated, at the layer opposite the "PE" layer, to a substantially gas-impermeable film, such as SiOx/PET, SARAN/PET, or a hot-blown, cast, or biaxially-oriented film containing an oxygen barrier material such as PVDC or EVOH. The resulting laminate is then heat-sealed to a product support member to form a package, with the "PE" layer being in contact with and bonded to the product support member.

Example 28

Packages were made in accordance with present invention having the following components:

A. a support member comprising an oriented and thermoformed polystyrene foam tray including a cavity and a peripheral flange with a single upper sealing surface, the support member further including a sealant film bonded to the upper surface of the cavity and flange; and B. one of the laminates or multilayer films from Examples 1–6 and 23–26 above, as well as Example 34 below, heat-sealed to the sealant film on the flange of the support member via a heat-weld which extended continuously around the upper sealing surface of the flange.

The support member was prepared in accordance with the above-referenced U.S. Ser. No. 08/326,176, the sealant film having the following structure:

LLDPE2/EVA3/TIE3/EVOH3/TIE3/EVA3/SBC

A section of laminate or multilayer film large enough to completely enclose the cavity of the support member was heat-sealed to the flange of the support member and then severed from a larger web of the laminate or film with a mechanical cutting element. Both of the foregoing steps (cutting and heat-welding) were accomplished with a Ross 3180 tray lidding machine. The machine had a heat-welding bar which applied heat (temperatures ranging from 250 to 295° F.) and pressure (80 psi) to the laminate for 1.2 seconds to effect a heat-weld between the laminate and the sealant film around the peripheral flange of the support member, with the "PE" layer of the laminates and films being in direct contact with and bonded to the support member.

The resultant lid (i.e., the laminate or multilayer film heat-sealed to the support member) on each of the packages was peelably delaminated at the indicated peelable interface. The results are as follows:

| LID | RESULT |
|---|---|
| Example 1 | Sealed and peeled well at the indicated peelable interface at a heat-weld temperature of 255° F. |
| Example 2 | Sealed and peeled well at the indicated peelable interface at a heat-weld temperature of 255° F. |
| Example 3 | Sealed poorly to tray at heat-weld temperature of 255° F.; when welded to tray at 280–295° F., peel initiation force was high, resulting in tearing of film remaining on package on approximately half of the tested packages. |
| Example 4 | Sealed poorly to tray at heat-weld temperature of 255° F.; when welded to tray at 280–295° F., peel initiation force was high, resulting in tearing of film remaining on package on approximately half the tested packages. |
| Example 5 | Sealed and peeled well at the indicated peelable interface at heat-weld temperatures ranging from 250–290° F. |
| Example 6 | Sealed and peeled well at the indicated peelable interface at heat-weld temperature of 255° F. |
| Example 23 | Delaminated from tray at heat-weld temperature of 252° F.; when welded to tray at 300° F., peel initiation force was high, resulting in tearing of film remaining on package. |
| Example 24 | Sealed and peeled well at the indicated peelable interface at heat-weld temperature of 252° F. |
| Example 25 | Sealed and peeled to tray at heat-weld temperature of 252° F., but peel force required to delaminate coextruded film was high, resulting in tearing of film remaining on package. |
| Example 26 | Sealed and peeled well at the indicated peelable interface at heat-weld temperature of 252° F. |
| Example 34 | Sealed and peeled well at the indicated peelable interface at heat-weld temperature of 255° F. |

The laminates of Examples 3 and 4 and multilayer films of Examples 23 and 25 are reformulated to include adhesion-promoting additives in the "PE" layer (i.e., the layer bonded to the tray) and adhesion-defeating additives in one or both layers at the peelable interface of the coextruded, multilayer film which delaminates.

Example 28

A delaminatable, coextruded, multilayer film in accordance with the present invention was prepared and had the following structure: *EVA4/PE/LLDPE1/TIE1/72.5% PEC+12.5% PPMB+15% PB/PE*

The film was successfully delaminated at the indicated peelable interface by applying a piece of masking tape to each of the major surfaces of the film (adhesive side of the tape in contact with the laminate) and pulling with sufficient peel force to overcome the intra-fdm cohesive force of the film.

Example 29

The following laminate was prepared in accordance with the invention:
<PP1/TIE4/TIE1/EVOH1/80% PA3+20% PA4/TIE1/LDPE/EMA>//*EVA4/EVA1/LLDPE1/TIE1/PETG /EVA1/PE*
(3.5 mils thickness)

Example 30

The following laminate was prepared in accordance with the invention:
<PP1/TIE4/TIE1/EVOH1/60% PA3+40% PA4/TIE1/LDPE/EMA>//*EVA4/EVA1/LLDPE1/TIE1/PETG /EVA1/PE*
(3.5 mils thickness)

Example 31

The following laminate was prepared in accordance with the invention:
<PP1/TIE4/TIE1/EVOH1/80% PA3+20% PA4/TIE1/LDPE/EMA>//*50% EVA4+50% EMA/EVA1/LLDPE1/TIE1/PETG/EVA1/PE*
(3.5 mils thickness)

Example 32

The following laminate was prepared in accordance with the invention:
*PE/EVA1/PETG/TIE1/LLDPE1/EVA1/50% EVA4+50% EMA*//) SARAN/PET
(1.5 mils thickness)

Example 33

Each of the laminates of Examples 29–32 were successfully delaminated at the indicated peelable intra-film interface (i.e., within one of the coextruded, multilayer films of the laminate) by applying a piece of masking tape to each of the major surfaces of the laminate (adhesive side of the tape in contact with the laminate) and pulling with sufficient peel force to overcome the intra-film cohesive force of the coextruded, multilayer film having the indicated peelable interface.

Example 34

A laminate in accordance with the invention prepared by adhesive lamination (urethane-based adhesive between "PE" and "LLDPE2" and a blend of methylene bis(phenyl isocyanate), an ethyl ester of acetic acid, and a polyol curing agent between "EVA5" and "SARAN") and had the following structure:
 #*PE/TIE2/90% EVOH4+10% PA4/TIE2/PE*#//<LLDPE2/EVA5/EVA5>//SARAN PET
(3.5–4 mils thickness)

This laminate was successfully delaminated at the indicated peelable intra-fiMm interface of the perforated, biaxially-oriented film by applying a piece of masking tape to each of the major surfaces of the laminate (adhesive side of the tape in contact with the laminate) and pulling with sufficient peel force to overcome the intra-film cohesive force of the biaxially-oriented oriented film.

What is claimed is:

1. A package, comprising:
   a. a product support member having a cavity formed therein;
   b. a product disposed in said cavity; and c. a lid enclosing the product within said cavity and being bonded to said support member, said lid comprising a laminate which comprises two or more films, at least one of said films being a coextruded, multilayer film, wherein said laminate delaminates within said coextruded, multilayer film when said laminate is subjected to a peel force ranging from 0.001 to 2.5 pounds per inch.

2. The package of claim 1, wherein said laminate delaminates into a substantially gas-impermeable portion and a gas-permeable portion, said gas-permeable portion being bonded directly to said support member such that said gas-impermeable portion is peelably removable from said package.

3. The package of claim 1, wherein said coextruded, multilayer film is perforated.

4. The package of claim 1, wherein said coextruded, multilayer film comprises two adjacent layers which separate from one another when said laminate is subjected to a peel force ranging from 0.001 to 2.5 pounds per inch.

5. The package of claim 4, wherein one of said two adjacent layers comprises a polar material and the other adjacent film layer comprises a non-polar material.

6. The package of claim 4, wherein
one of said two adjacent layers comprises polyethylene homopolymer or copolymer; and
the other adjacent film layer comprises at least one material selected from the group consisting of polyamide, copolyamide, polyester, copolyester, polyethylene copolymer, polypropylene homopolymer or copolymer, polycarbonate, polymethylpentene, polyvinylidene chloride copolymer, polyurethane, polybutylene homopolymer and copolymer, and polysulfone.

7. The package of claim 1, wherein said coextruded, multilayer film comprises at least one layer which internally separates when said laminate is subjected to a peel force ranging from 0.001 to 2.5 pounds per inch.

8. The package of claim 1, wherein
said coextruded, multilayer film is bonded to a second film;
said coextruded, multilayer film and said second film define an interface therebetween; and
at least one of said coextruded, multilayer film and said second film comprise a reactively-modified surface at said interface which bond the two films together.

9. The package of claim 8, wherein said coextruded, multilayer film and said second film are stretch-oriented films, each of said films comprising a polyolefin at said interface.

10. The package of claim 8, wherein at least one of said coextruded, multilayer film and said second film are not stretch-oriented and comprise, at said interface, at least one material selected from the group consisting of ethylene/vinyl acetate copolymer (EVA), ethylene/methacrylate copolymer (EMA), acrylic acid copolymers, methyl acrylic acid copolymers, acrylic acid-modified EVA or EMA, anhydride-modified EVA or EMA, and syndiotactic polymethylpentene.

11. The package of claim 8, wherein said second film comprises at least one material selected from the group consisting of vinylidene chloride copolymer, polyamide, polyethylene terephthalate, and ethylene/vinyl alcohol copolymer.

12. The package of claim 2, wherein said support member includes a peripheral flange extending outwardly from said cavity, said gas-permeable portion of said laminate being bonded to an upper surface of said flange via a heat-weld which extends continuously around said upper flange surface.

13. The package of claim 12, wherein said support member includes a sealant film having an upper principal surface and a lower principal surface, and wherein
the lower principal surface of said sealant film is bonded to said cavity and to said upper flange surface of said support member;
the upper principal surface of said sealant film defines the uppermost surface of said support member in contact with the product in said cavity and in contact with said gas-permeable portion of said laminate on said upper flange surface; and
said gas-permeable portion of said laminate is bonded, via said heat-weld, to said upper principal surface of said sealant film at said upper flange surface.

14. The package of claim 13, wherein said gas-permeable portion of said laminate and said sealant film define an interface therebetween, said gas-permeable portion and said sealant film comprising at least one material at said interface which is capable of forming a heat-weld with the other material.

15. A method of making a package, comprising:
a. providing a product support member having a cavity formed therein;
b. placing a product in said cavity;
c. providing a laminate comprising two or more films, at least one of said films being a coextruded, multilayer film, wherein said laminate delaminates within said coextruded, multilayer film when said laminate is subjected to a peel force ranging from 0.001 to 2.5 pounds per inch; and
d. placing said laminate over said support member and applying sufficient heat and pressure to said laminate to enclose the product within said cavity of said support member by forming a heat-weld which bonds said laminate to said support member.

16. The method of claim 15, wherein said laminate delaminates into a substantially gas-impermeable portion and a gas-permeable portion, said gas-permeable portion being bonded directly to said support member such that said gas-impermeable portion is peelably removable from said package.

17. The method of claim 15, wherein said coextruded, multilayer film is perforated.

18. The method of claim 16, further including, prior to enclosing the product within said support member, the step of at least partially evacuating said cavity of air and then at least partially filling said cavity with a gas which is lower in oxygen content than air.

19. The method of claim 18, further including, after the product has been enclosed within said support member, the step of modifying the gaseous conditions under which the product is packaged by peelably removing said gas-impermeable portion from said laminate, whereby air enters said cavity through the remaining gas-permeable portion of said lamiminate and displaces at least some of said gas which is lower in oxygen content than air.

20. The method of claim 15, wherein said coextruded, multilayer film comprises two adjacent layers which separate from one another when said laminate is subjected to a peel force ranging from 0.001 to 2.5 pounds per inch.

21. The method of claim 20, wherein one of said two adjacent layers comprises a polar material and the other adjacent film layer comprises a non-polar material.

22. The method of claim 20, wherein one of said two adjacent layers comprises polyethylene homopolymer or copolymer; and the other adjacent film layer comprises at least one material selected from the group consisting of polyamide, copolyamide, polyester, copolyester, polyethylene copolymer, polypropylene homopolymer or copolymer, polycarbonate, polymethylpentene, polyvinylidene chloride copolymer, polyurethane, polybutylene homopolymer and copolymer, and polysulfone.

23. The method of claim 15, wherein said coextruded, multilayer film comprises at least one layer which internally separates when said laminate is subjected to a peel force ranging from 0.001 to 2.5 pounds per inch.

24. The method of claim 15, wherein said coextruded, multilayer film is bonded to a second film;

said coextruded, multilayer film and said second film define an interface therebetween; and at least one of said coextruded, multilayer film and said second film comprise a reactively-modified surface at said interface which bond the two films together.

25. The method of claim 24, wherein said coextruded, multilayer film and said second film are stretch-oriented films, each of said films comprising a polyolefin at said interface.

26. The method of claim 24, wherein at least one of said coextruded, multilayer film and said second film are not stretch-oriented and comprise, at said interface, at least one material selected from the group consisting of ethylene/vinyl acetate copolymer (EVA), ethylene/methacrylate copolymer (EMA), acrylic acid copolymers, methyl acrylic acid copolymers, acrylic acid-modified EVA or EMA, anhydride-modified EVA or EMA, and syndiotactic polymethylpentene.

27. The method of claim 24, wherein said second film comprises at least one material selected from the group consisting of vinylidene chloride copolymer, polyamide, polyethylene terephthalate, and ethylene/vinyl alcohol copolymer.

* * * * *